(12) United States Patent
Rastegar

(10) Patent No.: US 10,203,042 B2
(45) Date of Patent: Feb. 12, 2019

(54) SELF-CONTAINED ACTUATED SAFETY VALVE FOR GASEOUS OR LIQUID FUEL LINES AND THE LIKE

(71) Applicant: Jahangir S Rastegar, Stony Brook, NY (US)

(72) Inventor: Jahangir S Rastegar, Stony Brook, NY (US)

(73) Assignee: OMNITEK PARTNERS LLC, Ronkonkoma, NY (US)

( * ) Notice: Subject to any disclaimer, the term of this patent is extended or adjusted under 35 U.S.C. 154(b) by 0 days.

(21) Appl. No.: 14/595,620

(22) Filed: Jan. 13, 2015

(65) Prior Publication Data

US 2016/0201816 A1    Jul. 14, 2016

(51) Int. Cl.
   *F16K 17/36*   (2006.01)
   *F16K 17/38*   (2006.01)
   *F16K 31/00*   (2006.01)

(52) U.S. Cl.
   CPC .......... *F16K 17/386* (2013.01); *F16K 31/002* (2013.01)

(58) Field of Classification Search
   CPC .............................. F16K 31/022; F16K 17/386
   USPC .......................... 137/38, 39, 45, 315.16, 457
   See application file for complete search history.

(56) References Cited

U.S. PATENT DOCUMENTS

| | | | | |
|---|---|---|---|---|
| 1,304,519 A | * | 5/1919 | Walker | F16K 31/56 251/303 |
| 1,591,241 A | * | 7/1926 | Sieben | F16K 17/386 137/77 |
| 2,249,970 A | * | 7/1941 | McKune | G05D 23/10 137/457 |
| 3,835,659 A | * | 9/1974 | McBride, Jr. | F16K 31/025 62/202 |
| 4,160,489 A | * | 7/1979 | Van Dillen | B60K 31/00 137/45 |
| 4,258,903 A | * | 3/1981 | Stevenson | F16K 21/04 251/313 |
| 4,549,717 A | * | 10/1985 | Dewaegheneire | F16K 17/38 137/457 |
| 4,915,122 A | * | 4/1990 | Ikegaya | F16K 17/363 137/38 |
| 4,981,261 A | * | 1/1991 | Bergmann | F16K 31/002 236/93 B |
| 6,142,167 A | * | 11/2000 | Pettesch | F16K 17/36 137/39 |

(Continued)

*Primary Examiner* — Umashankar Venkatesan

(57) ABSTRACT

A method for turning off fluid flow through a valve. The method includes: movably disposing a member in an interior of a housing between a first position in which an inlet and an outlet are in fluid communication with each other and a second position blocking the fluid flow; restraining the member in the first position when a fluid temperature in the interior or an ambient temperature outside the housing is below a threshold temperature; and releasing the restraint such that the member is capable of moving to the second position when the fluid temperature or the ambient temperature is above the threshold temperature; wherein the releasing comprises changing the shape of an actuator from a first shape restraining the member to a second shape releasing the restraint upon a change in the fluid temperature or the ambient temperature from below the threshold temperature to above the threshold temperature.

8 Claims, 15 Drawing Sheets

(56) References Cited

U.S. PATENT DOCUMENTS

| | | | |
|---|---|---|---|
| 7,219,687 B2* | 5/2007 | Vasquez | F03G 7/065 |
| | | | 137/457 |
| 7,424,978 B2* | 9/2008 | Vasquez | F03G 7/065 |
| | | | 236/101 D |
| 7,744,059 B2* | 6/2010 | Jerg | F16K 15/03 |
| | | | 251/11 |
| 8,844,554 B2* | 9/2014 | Kikuchi | A62C 35/60 |
| | | | 137/72 |

* cited by examiner

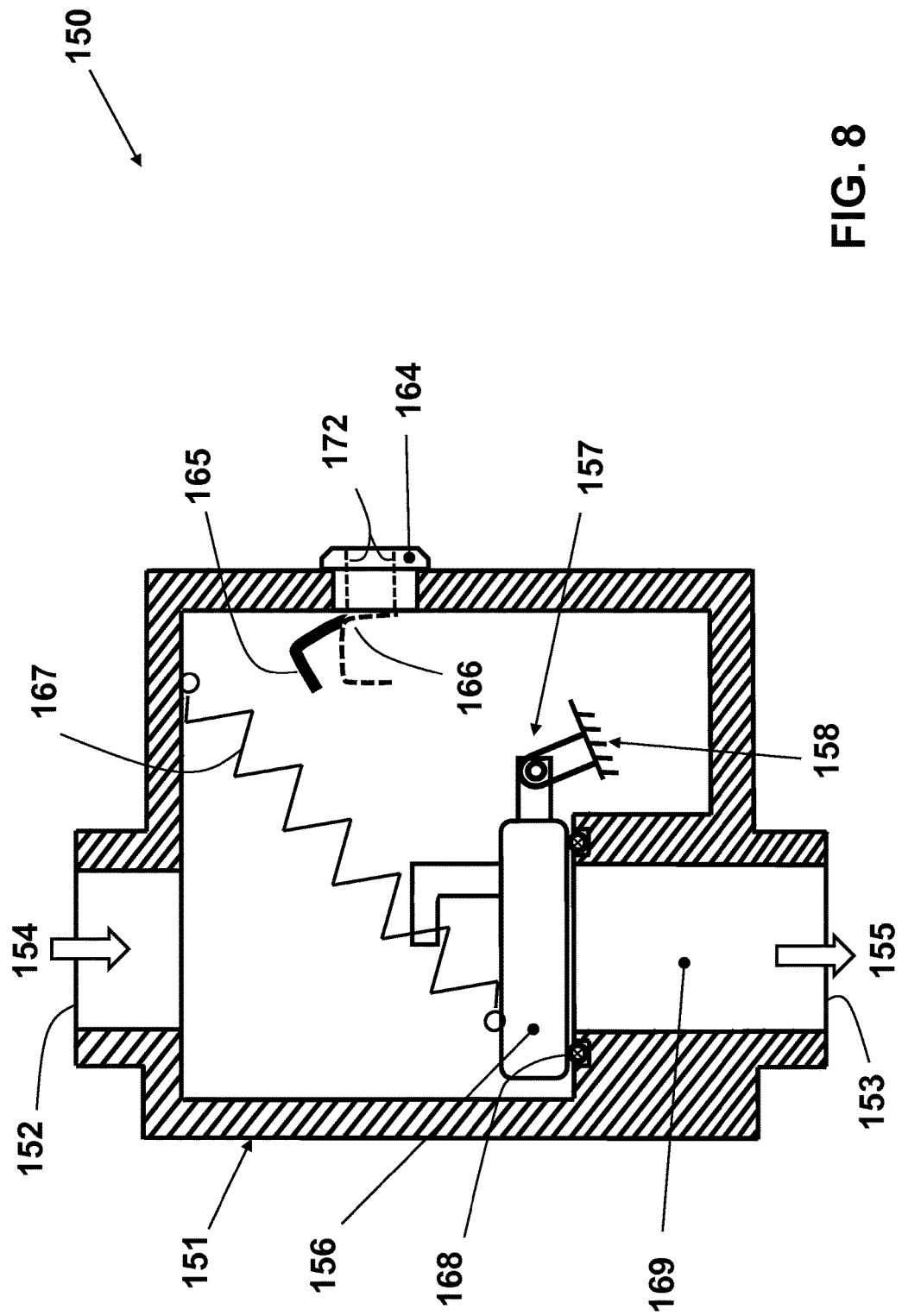

SELF-CONTAINED ACTUATED SAFETY VALVE FOR GASEOUS OR LIQUID FUEL LINES AND THE LIKE

BACKGROUND

1. Field

The present disclosure relates generally to a safety valve for gaseous and/or liquid fuel or other chemical lines, and more particularly, to a self-contained safety valve for gaseous or liquid fuel or other hazardous chemical lines which automatically closes the flow of gaseous or liquid fuel or other hazardous chemical when the surrounding temperature or the temperature of the gaseous or liquid fuel or other chemical substances passing through the valve rise above a predetermined threshold temperature.

2. Prior Art

There are currently devices known in the art for shutting the flow of gas such as natural gas or liquid fuel in homes or in commercial buildings in case of fire that operate based on an external and powered sensor to monitor the temperature and then command certain actuation device such as an electrically powered solenoid to actuate a valve or cause it to actuate a valve to close the flow of said gaseous or liquid fuel.

The currently available methods and devices are complex, expensive, generally require external power (either battery or line power) and the externally actuated valves require sealing of moving parts, which are prone to wear, and when made out of plastics are subject of aging and hardening and cracking, and thereby leakage, particularly for the case of gaseous fuel such as natural gas or propane and certain chemicals. In addition, for battery operated systems, the users often forget to test and change the batteries and for line powered devices the power may be out or go out or disconnected in case of fire or the like.

Valves using shape memory alloy actuation devices for preventing the flow of fluid when the temperature of the fluid is above a predetermined threshold is also disclosed in the U.S. Pat. No. 8,695,889. The valve is designed to allow the fluid to pass when the temperature of the fluid is below the predetermined threshold, and used a shape memory or bi-metal actuator for substantially closing the flow passage when the temperature of the fluid is above the predetermined threshold. Such valves, however, are not designed for closing the flow passage when heated either by the passing flow or from outside the valve.

SUMMARY

Therefore it is an object to provide a self-contained heat-actuated safety valve for gas lines, such as natural gas or propane gas lines or fluid fuel or hazardous chemical lines, which would which automatically closes the flow of the said gas or liquid when the surrounding temperature or the temperature of the gaseous or liquid fuel or other chemical flowing through the valve rises above a predetermined threshold temperature.

It is another object to provide a self-contained heat-actuated safety valve for gas lines or fluid fuel or hazardous chemical lines, which are not dependent on signals from external sensors and do not require electrical power such as from batteries or line power for their operation.

It is yet another object to provide a self-contained heat-actuated safety valve for gas lines or fluid fuel or hazardous chemical lines which is not prone to leakage from seals or between moving parts.

It is still a further object to provide such self-contained heat-actuated safety valve for gas lines or fluid fuel or hazardous chemical lines, which are inexpensive to fabricate.

Accordingly, a valve for stopping the flow of gaseous or liquid fuel or other hazardous chemical lines when the temperature in the environment or the flowing substances is above a predetermined threshold is provided. The valve comprises: a body having at least one opening for allowing the gas or fluid to pass through when the ambient temperature close to the valve is below the predetermined threshold; and a shape memory actuated mechanism for substantially closing the at least one opening when the ambient temperature close to or inside the valve is above the predetermined threshold to prevent the gas or fluid from passing through the valve. The shape memory actuated mechanism and other moving parts are preferably self-contained within the overall valve enclosure to minimize the possibility of leakage.

The flow prevention mechanism in the valve preferably comprises of a flap corresponding to the at least one opening, the flap being actuated by a shape memory alloy material based member having a shape at a temperature below the predetermined threshold such that it does not occlude the at least one opening and having a shape at a temperature above the predetermined threshold such that it does occlude the at least one opening to prevent the passage of gas or fluid through the valve outlet. The said flap actuator is preferably fabricated from a shape memory material that exhibits a two-way memory such that it has a first shape below the predetermined threshold so as the flap is such positioned not to occlude the at least one opening and has a second shape above the predetermined threshold so as to position the flap such that it would occlude the at least one opening.

Alternatively, the flow prevention mechanism in the valve preferably comprises of a flap corresponding to the at least one opening, the flap being normally held in a first position by a removable stop element such that it does not occlude the at least one opening. In its said first position, the flap is biased towards its second position by a preloaded spring element in which position it would occlude the at least one opening. The said removable stop element is provided with an actuation element that is preferably made out of a shape memory alloy or bimetal element. The shape memory alloy material based actuation element is designed and fabricated to have a shape at a temperature below the predetermined threshold such that it keeps the said removable stop element in the position that holds the flap in its said first position such that it does not occlude the at least one opening. The shape memory alloy material based actuation element would then deform into another shape at a temperature above the predetermined threshold such that it would cause the said removable stop element disengage the said flap, thereby allowing the flap to be moved by the said preloaded spring element to the position of occluding the at least one opening to prevent the passage of gas or fluid through the valve outlet. Alternatively, the actuation device of the said removable stop element may be made out of a bimetal member, which is configured to perform the same function as the described shape memory alloy based actuation device.

Alternatively, the flow prevention mechanism in the valve preferably comprises of ball or a cone or a section of a cone (hereinafter referred to collectively as a ball for brevity) instead of the aforementioned flap corresponding to the at least one opening. Then similar to the aforementioned flap, the ball is normally held in a first position by a removable stop element such that it does not occlude the at least one opening. In its said first position, the ball is biased towards its second position by a preloaded spring element in which position it would occlude the at least one opening. The said removable stop element is provided with an actuation element that is preferably made out of a shape memory alloy or bimetal element. The shape memory alloy material based actuation element is designed and fabricated to have a shape at a temperature below the predetermined threshold such that it keeps the said removable stop element in the position that holds the ball in its said first position such that it does not occlude the at least one opening. The shape memory alloy material based actuation element would then deform into another shape at a temperature above the predetermined threshold such that it would cause the said removable stop element disengage the said ball, thereby allowing the ball to be moved by the said preloaded spring element to the position of occluding the at least one opening to prevent the passage of gas or fluid through the valve outlet. Alternatively, the actuation device of the said removable stop element may be made out of a bimetal member, which is configured to perform the same function as the described shape memory alloy based actuation device.

BRIEF DESCRIPTION OF THE DRAWINGS

These and other features, aspects, and advantages of the apparatus and methods of the present invention will become better understood with regard to the following description, appended claims, and accompanying drawings where:

FIG. 8 illustrates the sectional view of the self-contained safety valve embodiment of FIG. 7, wherein the safety valve is in the closed position.

DETAILED DESCRIPTION

Although the safety valves described herein are applicable to different types of actuators, it has been found particularly useful in the environment of shape memory actuators. Therefore, without limiting the applicability of the invention to shape memory actuators, the invention will be described in such environment. For instance, the safety valves described herein can alternatively use a bi-metal actuator which changes shape due to a difference in thermal expansion of the metal comprising the bi-metal strip.

Although many shape-memory materials may be used, a nickel-titanium alloy (NiTi) is particularly suitable. One such NiTi alloy is manufactured, for example, by Shape Memory Applications, Inc., Santa Clara, Calif In general, metallic shape-memory alloys, such as NiTi, CuZnAl, and CuAlNi alloys, undergo a transformation in their crystal structure when cooled from the high-temperature austenite form, which is generally stronger, to the low-temperature martensite form, which is weaker. When a shape-memory material is in its martensitic form, it is easily deformed to a new shape. However, when the material is heated through its transformation temperature, it reverts to austenite and recovers its previous shape with great force. The temperature at which the material reverses its high temperature form when heated can be adjusted by slight changes in material composition and through heat treatment. The shape-memory process can be made to occur over a range of a few degrees, if necessary, and the shape transition can be made to occur millions of times.

Some shape-memory materials can be made to exhibit shape-memory only upon heating (one-way shape-memory), or also can undergo a shape change upon cooling (two-way shape memory). Shape-memory materials are available in many forms including, for example, wires, rods, ribbons, strips, sheets, and micro-tubing, and can be used to fabricate shape-memory structures having linear, planar and composite forms.

Figure 1:
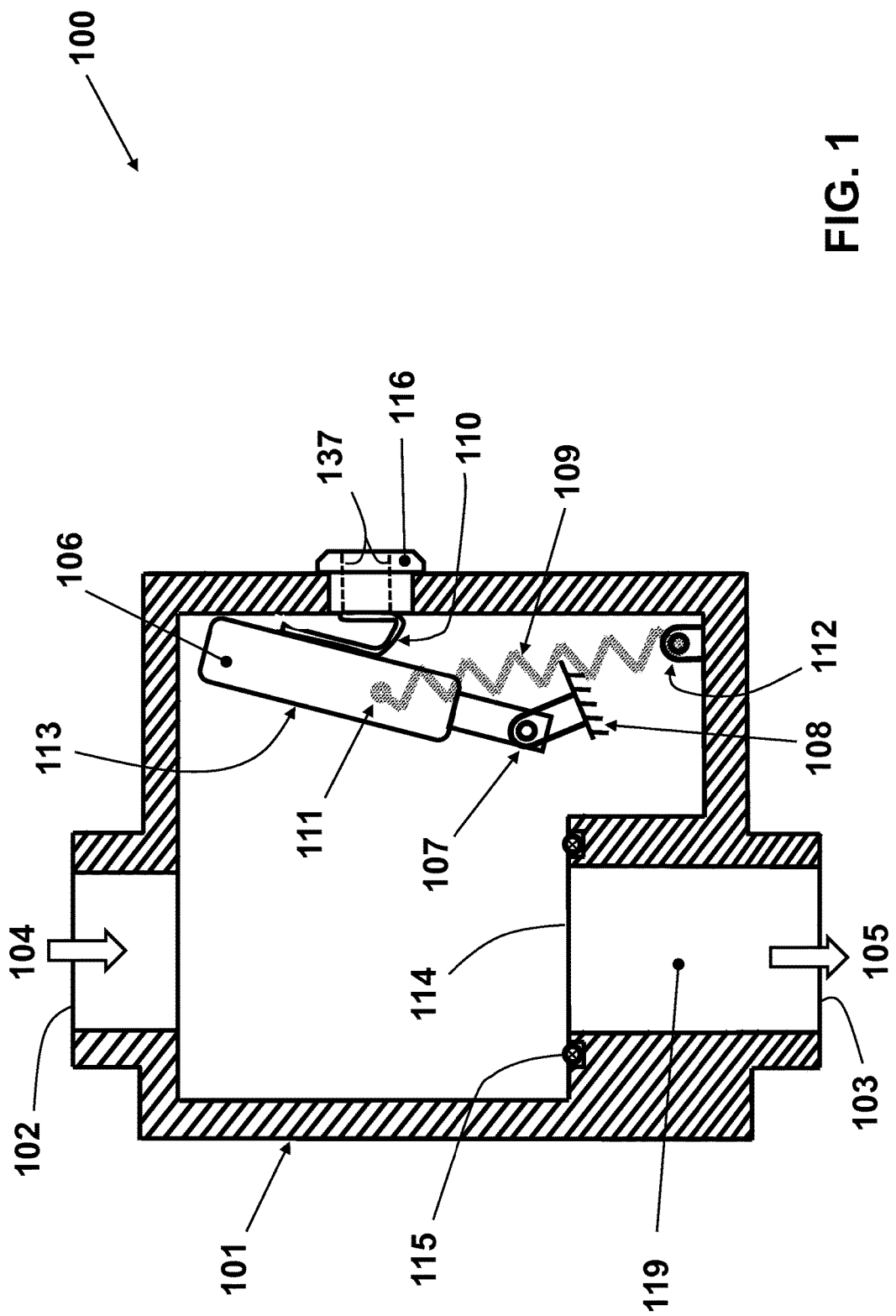
FIG. 1 illustrates a sectional view of a first embodiment of the self-contained safety valve actuated by external heating, wherein the safety valve is in an open position.
Figure 2:
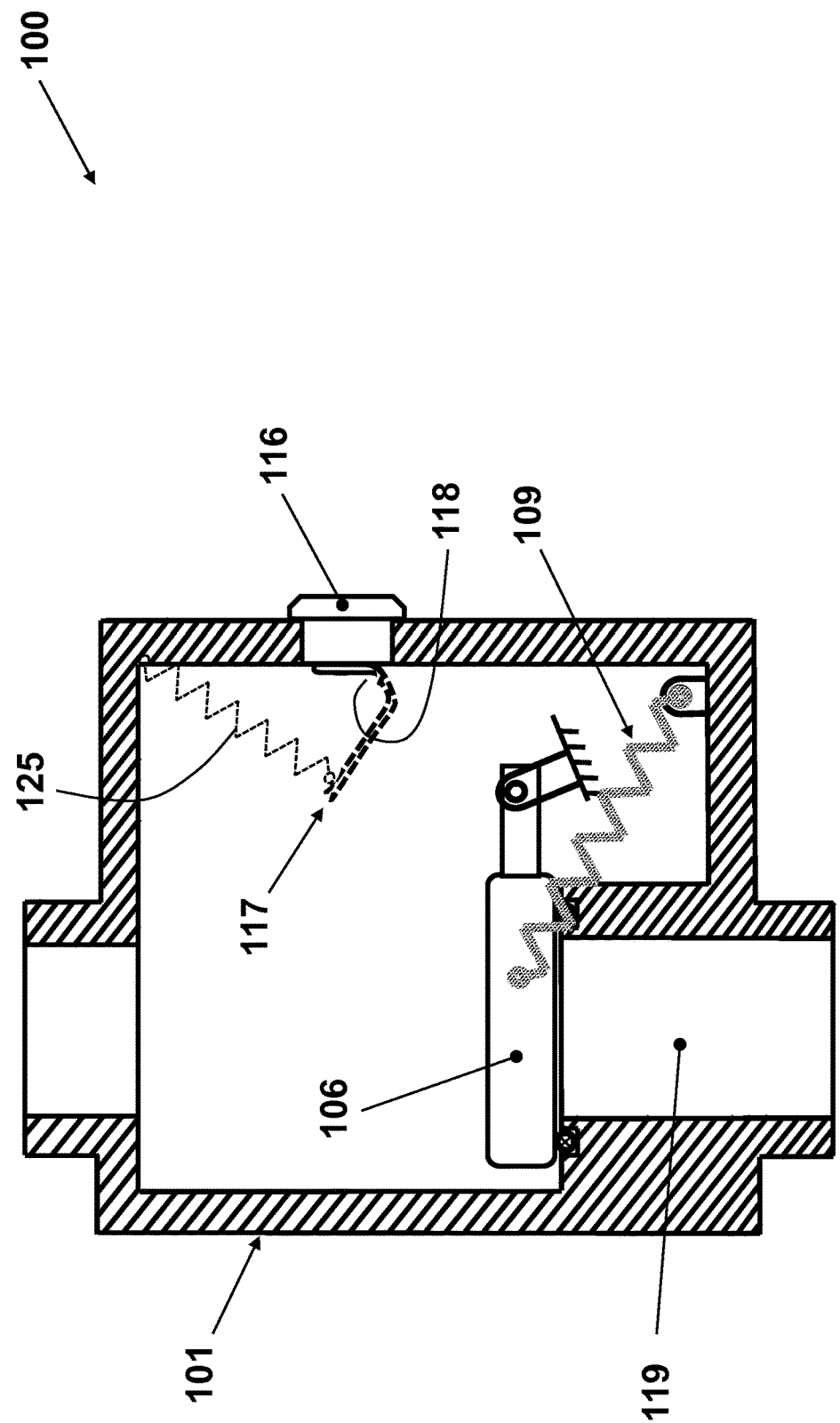
FIG. 2 illustrates the sectional view of the self-contained safety valve embodiment of FIG. 1, wherein the safety valve is in the closed position.

Referring now to FIGS. 1-2, there is shown a first embodiment 100 of the self-contained safety valve actuated by external heating, hereinafter referred to as "safety valve." The external heating may be due to fire or general temperature elevation without direct or proximity to fire or other heat source. The safety valve 100 is constructed with a housing 101, which may have been assembled from more than one part for ease of manufacture and assembly. The safety valve 100 is provided with at least one inlet 102 and at least one outlet 103 to accommodate inflow 104 and outflow 105, respectively, of the passing gaseous and/or liquid substances of interest. The inlet 102 and the outlet 103 may be provided with internal or external thread (not shown) for attachment to the intended gaseous and/or liquid substance lines. Alternatively, incoming and outgoing lines may be attached to the inlet 102 and outlet 103 by soldering, welding or any other methods appropriate for the transiting gaseous and/or liquid substance.

The safety valve 100 is provided with a cap 106, which is attached to the inside structure of the housing 101 at the indicated point 108 by a hinge joint 107. A tensile spring 109 is attached on one end to the cap 106, such as by a pin joint 111, and to the inside structure of the housing 101, such as by a pin joint 112, as shown in FIG. 1. In the configuration of the rotatable cap 106 shown in FIG. 1, the tensile spring 109 is preloaded in tension, thereby biasing the cap 106 to rest at its shown left most position against a shape memory alloy element 110. As can be seen in the schematic of FIG. 1, the rotating cap 106 and the preloaded tensile spring 109 are attached to the inner surface of the housing 101 such that they configure a so-called toggle mechanism, i.e., a bi-stable mechanism with two stable resting states, with the first stable positioning being as shown in the schematic of FIG. 1, where the preloaded tensile spring 109 is positioned on the right side of the joint 107 of the cap 106, and with the second stable positioning being as shown in the schematic of FIG. 2, where the preloaded tensile spring 109 is positioned on the left side of the joint 107 of the cap 106.

In the first stable toggle positioning, the cap 106 is shown to be resting against the shape memory alloy element 110 as shown in the schematic of FIG. 1. The aforementioned gaseous and/or liquid substances are thereby free to enter from the inlet 102 and exit from the outlet 103 as indicated by the arrows 104 and 105, respectively. Then when the temperature of the environment outside the safety valve 100 is increased, the element 116 which is made from a highly heat conductive material such as aluminum or copper or the like (and which may be integrally formed with the housing 101 or separately formed therefrom) would transmit heat to the shape memory alloy element 110. The shape memory actuator 110 can be fabricated from a relatively thin strip or formed wire of shape memory alloy material such as one of those previously described and is trained to change its shape in response rise in temperature above a predetermined threshold temperature.

In the present safety valve 100, the shape memory alloy element 110 is trained to change its shape from that shown in the schematic of FIG. 1 to that indicated by the numeral 117 in the schematic of FIG. 2 by bending at the region 118 of the shape memory alloy element 110, very close to the point of its attachment to the heat transferring element 116 for its fast response to temperature elevation above the predetermined threshold temperature. Therefore, although the shape memory alloy element 110 may be entirely formed of a shape memory material, only portion 118 may only be formed of such shape memory material.

The shape memory alloy element 110, FIG. 1 (117 after the shape change, FIG. 2) acts as an actuation element such that when its temperature has been raised above the aforementioned predetermined threshold temperature, it would change shape to that of 117, FIG. 2, thereby forcing the aforementioned toggle mechanism comprising of the cap 106 and the preloaded tensile spring 109 to be forced to be transferred from its first stable positioning shown in the schematic of FIG. 1 to its second stable positioning shown in the schematic of FIG. 2. It is noted that in its said second stable positioning, FIG. 2, the surface 113 of the cap 106 rests against the top surface 114 of the outlet passage of the safety valve 100, FIG. 1. In addition, an O-ring or the like sealing element 115 which can be made out of relatively elastic element, FIG. 1, is also provided between the mating surfaces 113 and 114 to ensure fluid sealing of the outlet passage 119, FIGS. 1-2. Furthermore, as shown in FIGS. 1 and 2, the direction of fluid flow can be such that it would tend to keep the cap 106 closed with regard to the outlet 103 and sealed against the sealing element 115. In addition, the spring 109 is configured such that it can also bias the cap 106 towards a sealing engagement with the sealing element 115 when the cap is in its second stable positioning.

In operation, one or more safety valves 100 are positioned along the desired gaseous and/or liquid line. The installed safety valves 100 are installed in their normally open configuration shown in FIG. 1. Then if the temperature around a safety valve rises above the aforementioned predetermined threshold temperature setting of the safety valve, the heat transferred via the highly conductive element 116 causes the temperature of the safety valve shape memory alloy actuation element 110 to rise to the predetermined threshold temperature level. As a result, the shape memory alloy 110 changes its shape to that of 117 shown in FIG. 2, thereby forcing the cap 106 to move from its first stable positioning shown in FIG. 1 to its second stable positioning shown in FIG. 2 as described earlier, and thereby cause the flow passage to the outlet 119 and thereby the flow of the said gaseous and/or liquid to be stopped.

In the embodiment of FIG. 1, when the safety valve 100 is exposed to an ambient temperature above the predetermined threshold temperature for which it is designed, its shape memory alloy actuator element 110 actuates as described above and causes the cap 106 to move to its configuration shown in FIG. 2 and cause the flow of the said gaseous and/or liquid to be stopped. Then when the ambient temperature falls below the said predetermined threshold temperature, the cap 106 remains in its configuration of FIG. 2 and the valve passage 119 for the flow of the line gaseous and/or liquid substances remains closed. Such safety valve designs are highly useful in housing or commercial buildings or various plants and the like so that after fire and serious damage to the building structures and/or equipment or the like that makes the related buildings and/or plants or the like inoperable and sometimes abandoned for a period of time, the flow of gaseous and/or liquid fuel or other chemicals substances is not accidentally resumed or even intentionally resumed by someone to cause further damage.

In other applications, however, it might be desirable that following each safety valve flow closure following an environmental temperature rise above the aforementioned predetermined threshold temperature, hereinafter referred to as the "high temperature threshold", once the environmental temperature drops a prescribed amount below the temperature "high temperature threshold", hereinafter referred to as the "low temperature threshold", then the safety valve is to be returned to its open configuration to allow free flow of the line gaseous and/or liquid substances.

It is appreciated by those skilled in the art that the above task of resetting the safety valve 100 to its open positioning following a "high temperature threshold" event may be accomplished using many different means and mechanisms, including manually returned. In certain applications, it might be preferred that the user disconnects the safety valve from at least the input or the output line for inspection and to ensure that it has not been subjected to permanent damage due to the exposure to the high temperature threshold event, particularly if it is due to fire or other similar events. However, in certain cases, where the environmental temperature does go over the high temperature threshold often, for example, due to excessive heat being emitted from a nearby furnace, or in cases that the material being transferred is hazardous and is not desired to be spilled out from the connecting pipes, then an externally actuated means is desired to be provided for resetting the safety valve to its open positioning. It will be appreciated by those skilled in the art that many such resetting mechanisms may be provided. An example of such a resetting mechanism is shown in the schematic of FIG. 3.

Figure 3:
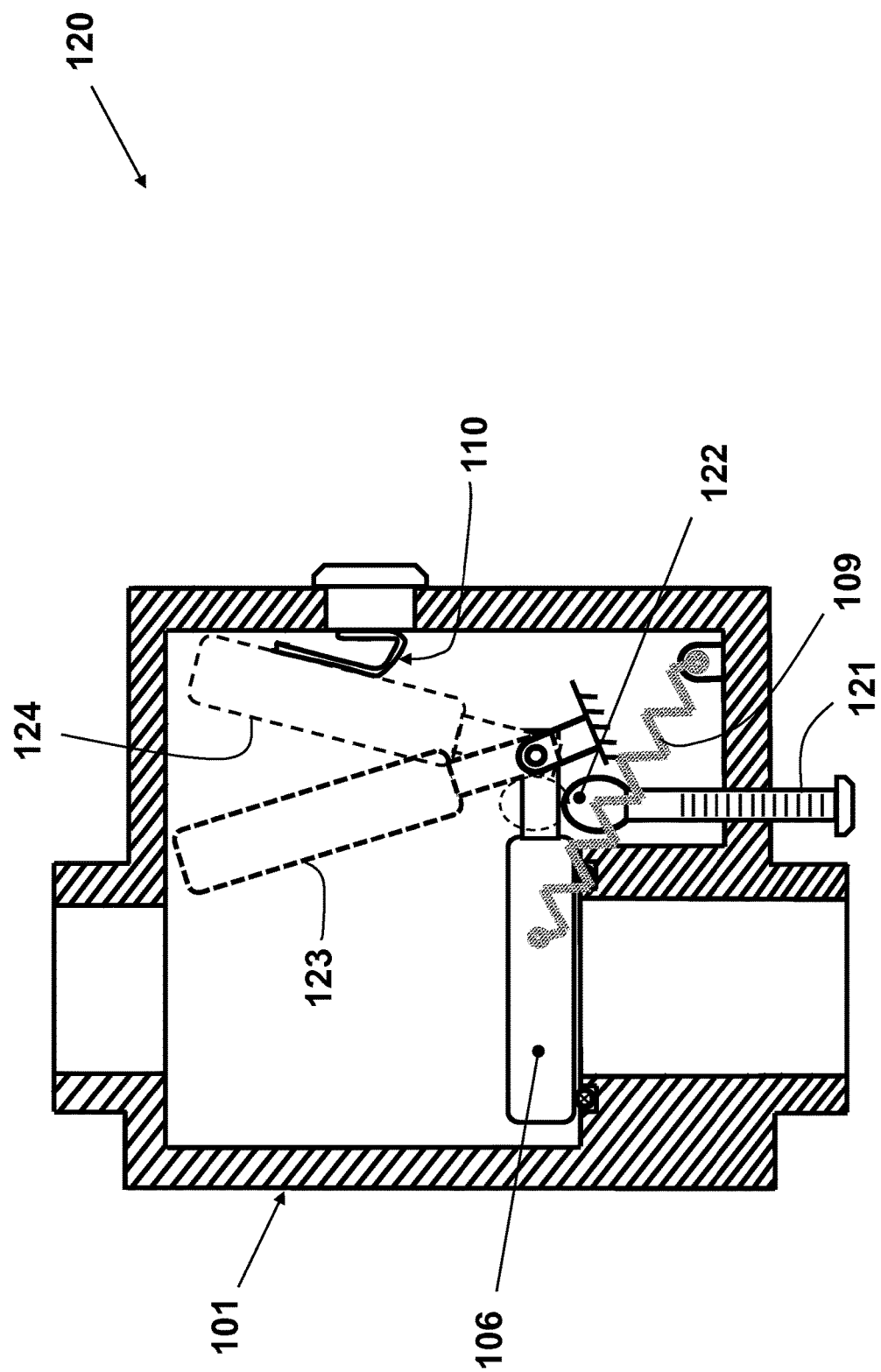
FIG. 3 illustrates the sectional view of the self-contained safety valve embodiment of FIG. 1 with a screw mechanism for resetting the valve into its open position following exposure to a temperature above the predetermined threshold temperature.

In the schematic of FIG. 3, the safety valve is shown with the cap 106 in its closed position. In this safety valve embodiment, generally referred to by reference numeral 120, the safety valve is provided with a resetting screw 121, which can also be provided with a relatively round tip piece 122. Then when the cap 106 is in its closed position shown in FIG. 3, the safety valve 120 can be reset to its open positioning shown in FIG. 1 by advancing the screw 121 upward and thereby causing the tip element 122 to lift the cap 106 upwards towards the position indicated by the numeral 123 and drawn by dashed lines. At around its positioning 123, the cap 106 has been moved passed its singular positioning between its aforementioned first and second stable positions, and would thereby be forced by the spring 109 to move into its aforementioned first stable positioning 124 (also as shown in the schematic of FIG. 1). As the cap 106 is forced to move into its positioning 124, the shape memory alloy actuating element 110 is deformed back to its original configuration as shown in FIG. 3 and also in FIG. 1 by the cap 106. The resetting screw 121 is then retracted to its positioning shown in FIG. 3 to make the safety valve fully functional by allowing external heating as was previously described to actuate the cap 106 back to its second stable positioning (FIGS. 2 and 3) and stop the flow of the passing gaseous and/or fluid substances.

In practice, the resetting screw is properly sealed to prevent any leakage of the flowing gaseous and/or liquid fluid out of the valve. Such means of externally providing sealing elements that are pressurized against the surfaces of the screw 121 and the valve housing 101 and other similar methods of providing proper sealing to prevent leakage around the screw 121 are well known in the art and may be selected depending on the type of gaseous and/or liquid substances that are being passed through the valve.

Figure 4:
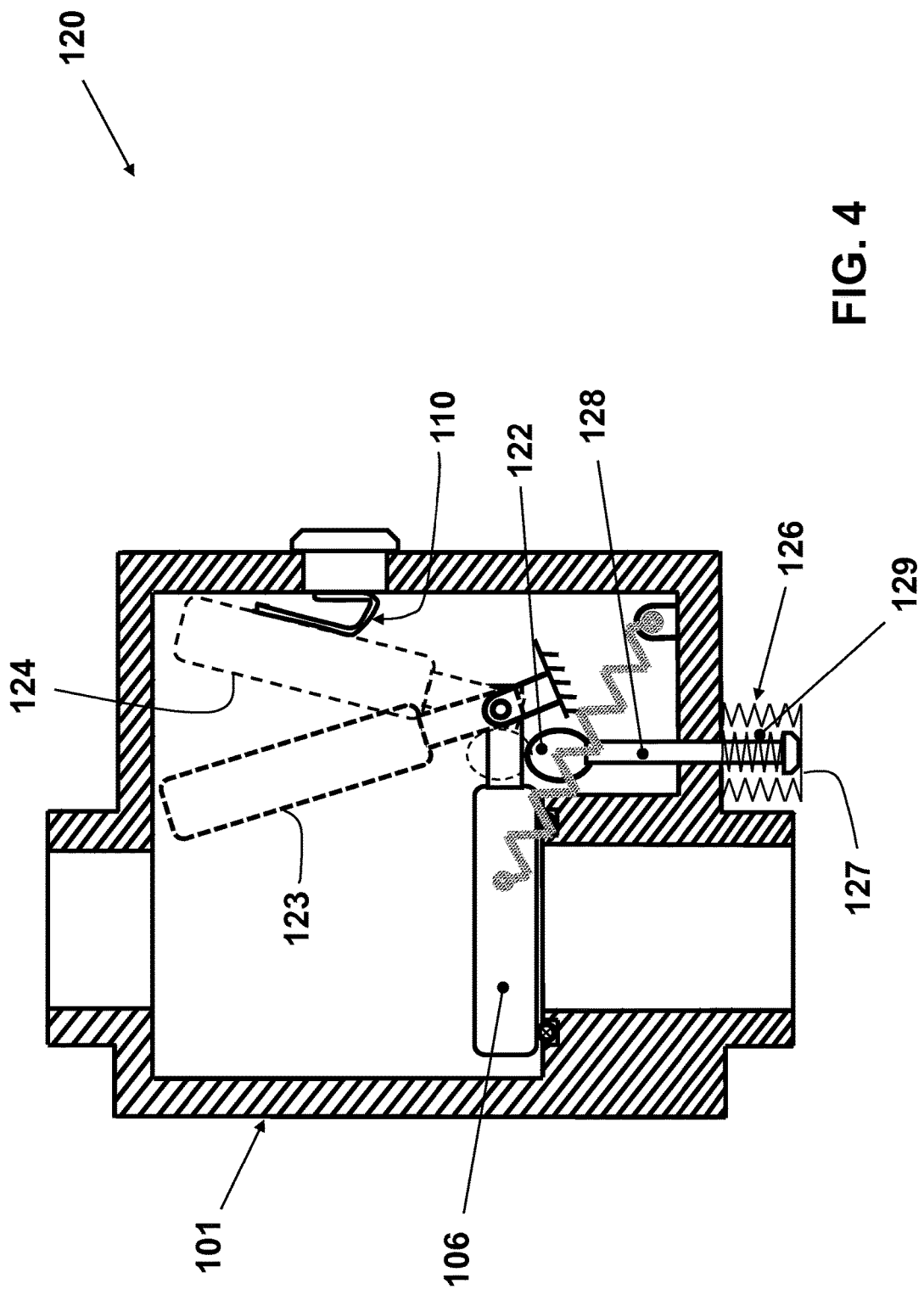
FIG. 4 illustrates the sectional view of the self-contained safety valve embodiment of FIG. 1 with a bellow type mechanism for resetting the valve into its open position following exposure to a temperature above the predetermined threshold temperature.

Alternatively, the resetting element of the disclosed safety valves may be constructed as being inherently sealed, for example by using a closed end, preferably metal, bellow 126 as shown in the schematic of FIG. 4. In this embodiment, the bellow has an integral top 127, and is attached to the surface of the safety valve 101 as shown in FIG. 4, such as by welding or the like. The setting screw 121 shown in the embodiment of FIG. 3 is then replaced by a sliding pin 128, with the previously described tip element 122as shown in the schematic of FIG. 4. The pin 128 may also be provided with a compressive return spring 129 to return it to its retracted positioning shown in FIG. 4 following each safety valve resetting as was described for the setting screw 121 of FIG. 3. The pin 128 otherwise functions as the setting screw 121 as was previously described for the embodiment of FIG. 3. The use of such a bellow 126 element which is fully sealed to the housing 101 of the present safety valves ensures that no gaseous and/or fluid substance that is passing through the safety valve would leak outside. Such an embodiment is particularly suitable for safety valves used on gas lines as long as the gas pressure is not too high. Otherwise when the passing gaseous and/or liquid material passing through the safety valve are at relatively high pressure, then the use of the setting screw 121 shown in FIG. 3 may be more appropriate.

It will be appreciated that the shape memory alloy element 110 may also be provided with a preloaded spring (elastic) element 125, FIG. 2, that once it has changed shape from the configuration 110 shown in FIG. 1 to that of configuration 117 shown in FIG. 117, then when the temperature of the shape memory alloy element falls below the predetermined threshold temperature, the preloaded spring (elastic) element 125 would force the shape memory alloy element (117 in FIG. 2) to deform back to its original (pre-shape change, 110 in FIG. 1) configuration. In the schematic of FIG. 2, the preloaded spring (elastic) element 125 is shown as a helical spring that is attached on one end to the shape memory alloy element 117 and on the other end to the inside of the valve housing 101. The spring element 125 is preloaded in tension enough to deform the shape memory alloy element 117 back to its configuration shown in FIG. 1 when the temperature of the shape memory alloy element 117 drops below the aforementioned predetermined threshold temperature, but the level of tensile preloading force is low enough to allow the shape memory alloy element 110 to actuate the cap 106 from its first stable positioning, FIG. 1, to its second stable positioning, FIG. 2, when its temperature rises above the predetermined threshold temperature.

In the configuration shown in FIG. 2, the spring element 125 is shown as a helical tensile spring mainly for the sake of clarity. However, it will be appreciated by those skilled in the art that many other preloaded spring/elastic elements may also be used to perform the same task. In an embodiment, the preloaded spring element is a bending element that can stretch along at least a portion of the length of the shape memory alloy element and engage the shape memory alloy at its tip. Such an elastic element provides the aforementioned function of the helical spring element 125 in a bending mode.

As was previously indicated, the shape memory actuation element 110, FIG. 1, may be fabricated from a strip or wire or other similarly shapes of the said material.

Figure 5B:
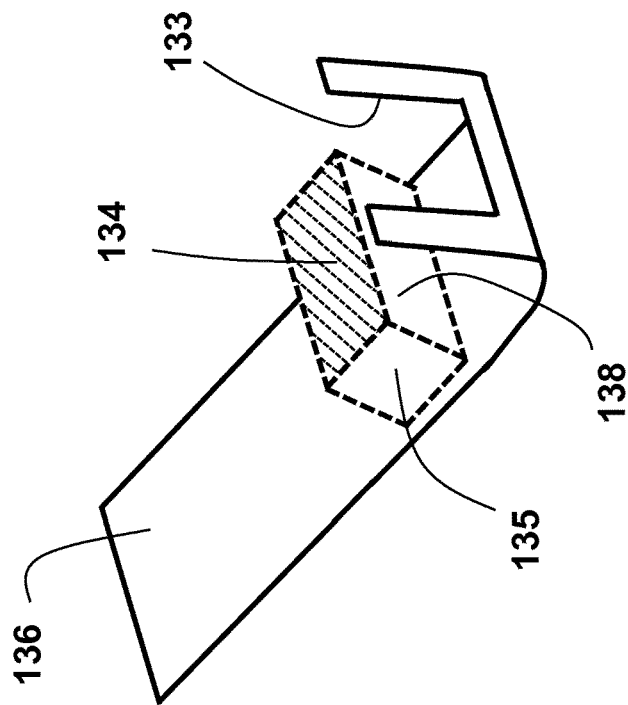
FIGS. 5A and 5B illustrates a typical shape memory alloy actuator fabricated from a strip of said material for use in the safety valve embodiments of FIGS. 1-4.
Figure 5A:
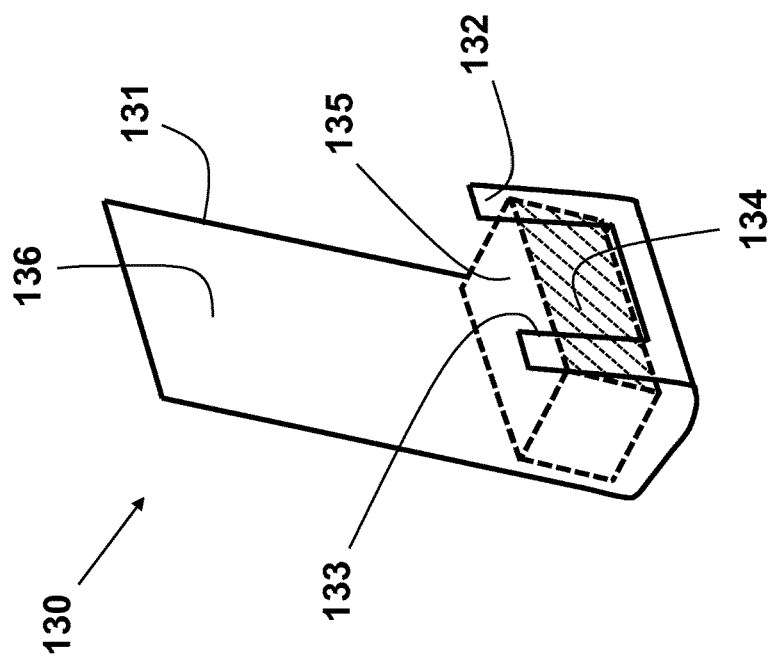

For example, shape memory alloy actuator 110, FIG. 1, may be made as shown in the schematic of FIG. 5A and indicated by the numeral 130 from a relatively thin strip 131 of shape memory alloy. In FIG. 5A the shape memory actuator 130 is shown to be shaped as the element 110 in FIG. 1, in which the safety valve is in its open configuration. As can be seen in FIG. 5A, the shape memory alloy strip 131 is bent to the illustrated shape, with the frontal surface 132 being the surface that is attached to the inner surface of the safety valve heat conducting element 116. The frontal portion 132 of the strip 131 may be provided with a cutaway section 133, which can be large enough to provide a clear view of the frontal surface 134 (which can be colored, such as being green) of the element 135. The element 135 with the clearly marked surface 134 (for example painted green to clearly contrast its other side surface colors) is used to indicate when the safety valve is in its open positioning, FIG. 1. The colored or marked surface 134 (for example green) would be clearly visible to the onlooker through a provided transparent window (shown by dashed lines in FIG. 1 and indicated by the numeral 137) on the element 116 which is properly sealed to the safety valve heat conducting element 116. The element 135 may be made out of any material that is compatible with the gas and/or liquid that passes through the safety valve. The element is attached to the surface 136 of the shape memory alloy strip 131 so that upon actuation, i.e., upon shape change to the configuration shown in FIG. 5B (117 in FIG. 2), the surface 134 (indicating an open valve) is moved away from the view of the window 137, FIG. 1. When desired, the surface 138, FIG. 5B, that comes into the view of the window 137 may be provided with a different color (e. g., red or white) to indicate that the valve is closed. When both open and closed indication is desired, the element 135 may held against the frontal surface 132 of the strip 131, and rotated by the rotation of the back portion 136 of the strip 131 from the configuration of FIG. 5A to that of FIG. 5B.

Figure 6B:
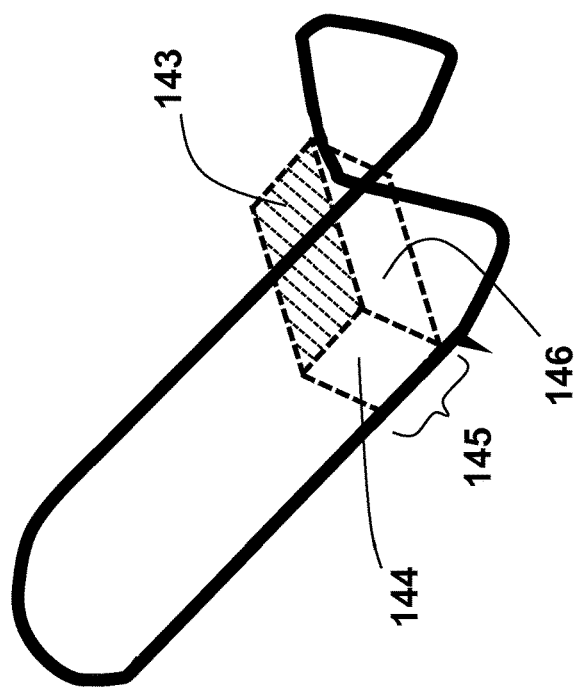
FIGS. 6A and 6B illustrates an alternative construction of the shape memory alloy actuator as fabricated from a wire of said material for use in the safety valve embodiments of FIGS. 1-4.
Figure 6A:
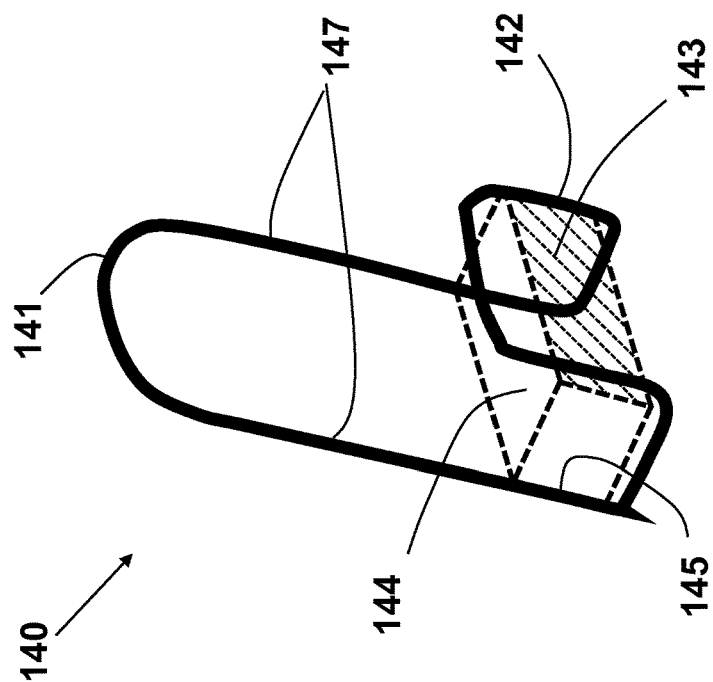

Alternatively, the shape memory alloy actuator 110, FIG. 1, may be made as shown in the schematic of FIG. 6A and indicated by the numeral 140 from a wire element 131 of shape memory alloy. In FIG. 6A the shape memory actuator 140 is shown to be shaped as the element 110 in FIG. 1, in which the safety valve is in its open configuration. As can be seen in FIG. 6A, the shape memory alloy wire 141 is formed to the illustrated shape, with the surface of the frontal portion 142 being the surface that is attached to the inner surface of the safety valve heat transfer element 116, FIG. 1. The frontal portion 142 of the shape memory alloy wire 111 is also seen to provide access for viewing the frontal surface 143 (such as by being colored, such as being green) of the element 144. The element 144 with the clearly marked surface 143 (for example painted green to clearly contrast its other side surface colors) is used to indicate when the safety valve is in its open positioning, FIG. 1. The colored or marked surface 143 (for example green) would be clearly visible to the onlooker through a provided transparent window (shown by dashed lines in FIG. 1 and indicated by the numeral 137) on the element 116. The element 144 may be made out of any material that is compatible with the gas and/or liquid that passes through the safety valve. The element is attached to the area 145 of the shape memory alloy wire 141 as shown in FIGS. 6A and 6B, so that upon actuation, i.e., upon shape change to the configuration shown in FIG. 6B (117 in FIG. 2), the surface 143 (indicating an open valve) is moved away from the view of the window 137, FIG. 1. When desired, the surface 146, FIG. 6B, that comes into the view of the window 137 may be provided with a different color (e. g., red or white) to indicate that the valve is closed. When both open and closed indication is desired, the element 144 may held against the frontal portion 142 of the shape memory alloy wire 141, and rotated by the rotation of the back portion 147 of the wire 141 from the configuration of FIG. 6A to that of FIG. 6B.

In the safety valve embodiments of FIGS. 1-6, shape memory alloy actuators (element 110 in the embodiment 100 of FIG. 1) are used to rotate a cap (element 106 in the embodiment of FIG. 1) and thereby cause it to move to the position if closing the flow of gas and/or fluid through the safety valve (FIG. 2). Alternatively, a shape memory alloy element may be used to release the element that is used to close the flow of gas and/or fluid through the safety valve, where the flow closing element is otherwise biased by at least one spring (elastic) element to move into the flow closing positioning. The basic design and operation of two such safety valve mechanism embodiments are described below.

Figure 7:
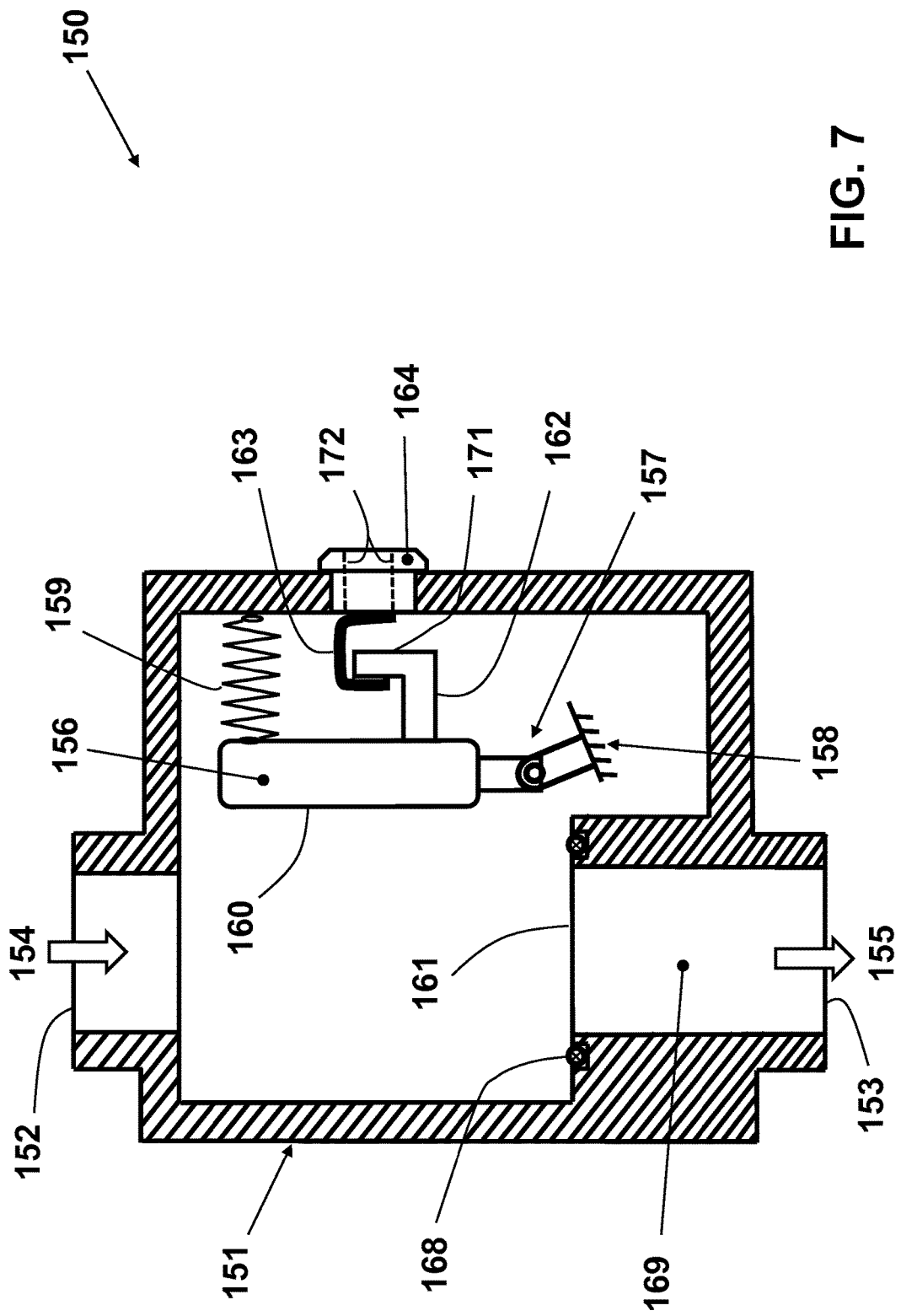
FIG. 7 illustrates a sectional view of a second embodiment of the self-contained safety valve actuated by external heating, wherein the safety valve is in an open position.

Referring to FIGS. 7-8, there is shown a first embodiment 150 of such self-contained safety valve that upon external heating to a predetermined threshold temperature would cause a shape memory alloy element change its shape and thereby release a biased flow closing element to move into its flow closing positioning. The external heating may have fire or general temperature elevation without direct or proximity to fire or other heat source.

Similar to the safety valve embodiment 100 of FIGS. 1-2, the safety valve 150 is also constructed with a housing 151, which may have been assembled from one or more than one part for ease of manufacture and assembly. The safety valve 150 is similarly provided with at least one inlet 152 and at least one outlet 153 to accommodate inflow 154 and outflow 155, respectively, of the passing gaseous and/or liquid substances of interest. The inlet 152 and the outlet 153 may similarly be provided with internal or external thread (not shown) for attachment to the intended gaseous and/or liquid substance lines. Alternatively, incoming and outgoing lines may be attached to the inlet 152 and outlet 153 by soldering, welding or any other methods appropriate for the transiting gaseous and/or liquid substance.

The safety valve 150 is also provided with a cap 156 (similar to the cap 106 in FIGS. 1-2), which is attached to the inside structure of the housing 151 at the indicated point 158 by a hinge joint 157. At least one preloaded compressive spring 159 is attached on one end to the cap 156, such as by a pin joint (not shown), and to the inside structure of the housing 151, such as by another pin joint (not shown), FIG. 7. In the configuration of the rotatable cap 156 shown in FIG. 7, the preloaded compressive spring 159 is seen to be biasing the cap 156 to rotate in the counterclockwise direction, thereby causing its surface 160 to come to rest against the top surface 161 of the outlet passage of the safety valve 150 as is shown in FIG. 8, thereby closing the flow through the safety valve.

The cap 156 is provided with an "L" shaped element 162, which when the safety valve 150 is in its open configuration as shown in FIG. 7, engages the "inverted U" shaped shape memory alloy element 163, which functions as a stop element to hold the preloaded spring biased cap 156 in the configuration shown in FIG. 7. Thereby the aforementioned gaseous and/or liquid substances are free to enter from the inlet 152 and exit from the outlet 153 as indicated by the arrows 154 and 155, respectively. Then when the temperature of the environment outside the safety valve 150 is increased, the element 164 which is made from a highly heat conductive material such as aluminum or copper or the like would transmit heat to the shape memory alloy element 163. The shape memory element 163 (or a portion thereof) can be fabricated from a relatively thin strip or formed wire of shape memory alloy material such as one of those previously described (FIGS. 5 and 6) and is trained to change its shape in response rise in temperature above a predetermined threshold temperature. In the present safety valve 150, the shape memory alloy element 163 is trained to change its shape from that shown in the schematic of FIG. 7 to that indicated by the numeral 165 in the schematic of FIG. 8 by bending, such as at the region 166 of the shape memory alloy element 163, FIG. 7, very close to the point of its attachment to the heat transferring element 164 for its fast response to temperature elevation above the said predetermined threshold temperature. The shape memory alloy element 163 may be similarly attached to the surface of the element164 as shown in FIG. 7 by welding, soldering or other methods known in the art.

Therefore when the temperature of the shape memory alloy element 163 has been raised to above the aforementioned predetermined threshold temperature it would change shape to that of 165 shown in FIG. 8. The cap 156 is then released and the preloaded compressive spring 159 (indicated by the numeral 167 in FIG. 8) would force the cap to rotate and come to rest against the outlet 161, FIGS. 7 and 8. It is noted that in its latter positioning, the surface 160 of the cap 156 rests against the top surface 161 of the outlet passage of the safety valve 150, FIG. 7. In addition, an O-ring or the like sealing element 168 which can be made out of a relatively elastic element is also provided between the mating surfaces 160 and 161 to ensure proper sealing of the outlet passage 119, FIGS. 1-2.

In the embodiment 150 of FIG. 7 the biasing spring 159 is shown to be a preloaded helical compressive spring. It will be however appreciated by those skilled in the art that a wide range of preloaded tensile, compressive, torsion springs and other types of elastic elements such as those operating in bending or their combination may also be used to provide the required biasing force/torque to rotate the cap 156 from its positioning shown in FIG. 7 to that of FIG. 8.

It will also be appreciated by those skilled in the art that the frontal surface 171 of the "L" shaped element 162 may be appropriately marked, for example painted in green color, to indicate when the safety valve is in its open positioning, FIG. 7. The colored or marked surface 171 would then be clearly visible to the onlooker through a provided transparent window (shown by dashed lines in FIG. 7 and indicated by the numeral 172) on the element 164.

Figure 9B:
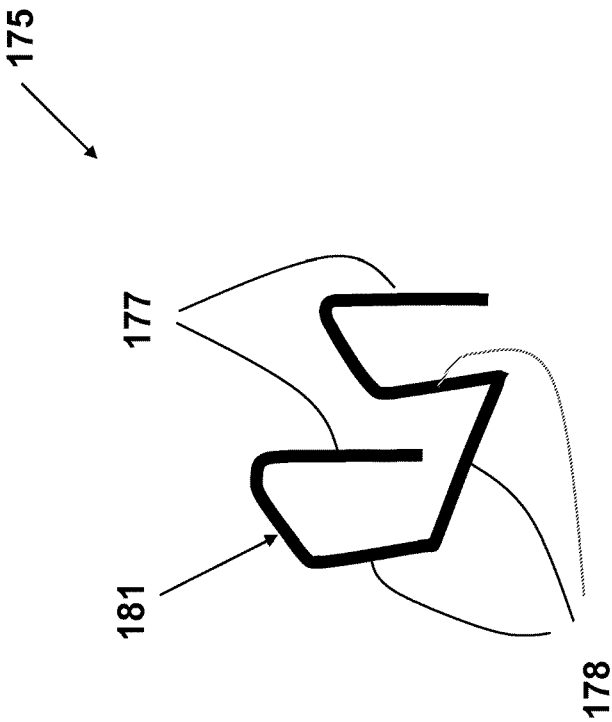
FIGS. 9A and 9B illustrates a typical shape memory alloy actuator fabricated from a strip or wire, respectively, of said material for use in the safety valve embodiment of FIG. 7.
Figure 9A:
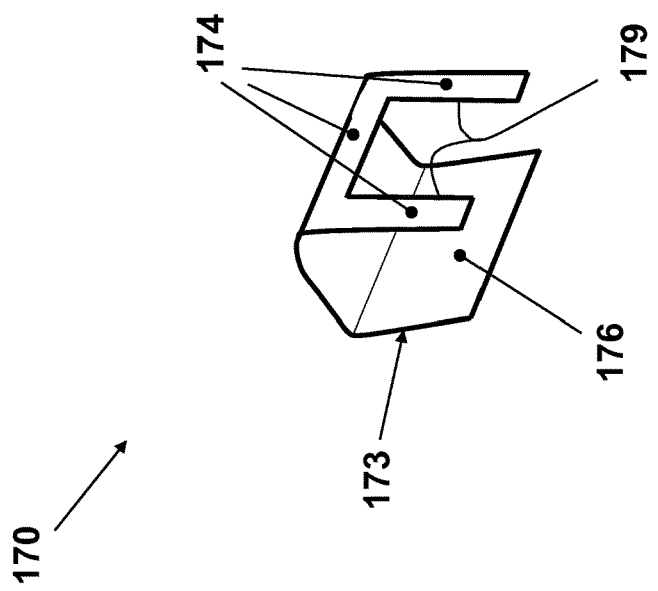

It will be appreciated by those skilled in the art that similar to the shape memory alloy actuator 110 of FIG. 1, the shape memory alloy element 163 of the embodiment 150 of FIG. 7 may also be constructed by a strip of shape memory alloy material as shown in the schematic of FIG. 9A and indicated by the numeral 170 or from a shape memory alloy wire as shown in the schematic of FIG. 9B and indicated by the numeral 175. As can be seen in FIG. 9A, the shape memory alloy element is formed from a strip of shape memory alloy material 173, which is bent into the indicated inverted "U" shaped form of element 163 for assembly in the safety valve in its open configuration as shown in FIG. 7. As can be seen in FIG. 9A, frontal surface 174 of the shape memory alloy element 170, which is the surface that is attached to the inner surface of the safety valve heat conducting element 164. The frontal portion 174 of the strip 173 may be provided with a cutaway section 179, which can be large enough to provide a clear view of the frontal surface 171 (which can be colored green) of the element "L" shaped element 162, FIG. 7. The visible and clearly marked surface 171 (for example painted green to clearly contrast its other side surface colors) is used to indicate that the safety valve is in its open positioning, FIG. 7. The colored or marked surface 171 would be clearly visible to the onlooker through a provided transparent window (shown by dashed lines in FIG. 7 and indicated by the numeral 172) on the element 164. Then when the safety valve 150 is in its closed configuration shown in FIG. 8, the said colored or marked surface 171 is no longer visible to the onlooker and is an indication that the safety valve is in its closed configuration.

Alternatively, the shape memory alloy actuator 163, FIG. 7, may be made as shown in the schematic of FIG. 9B and indicated by the numeral 175 from a wire element 181 of shape memory alloy. In FIG. 9B the shape memory actuator 181 is shown to be shaped as the element 163 in FIG. 7, in which the safety valve is in its open configuration. As can be seen in FIG. 9B, the shape memory alloy wire 181 is formed to the illustrated shape, with the surface of the frontal portion 177 being the surface that is attached to the inner surface of the safety valve heat conducting element 164, FIG. 7. The frontal portion 177 of the shape memory alloy wire 181 is also seen to provide access for viewing the frontal surface 171 (which can be colored green) of the "L" shaped element 162, FIG. 7. The clearly marked surface 171 (for example painted green) is used to indicate that the safety valve is in its open positioning, FIG. 7. The colored or marked surface 171 would be clearly visible to the onlooker through the provided transparent window 172 provided in the element 164.

Figure 10:
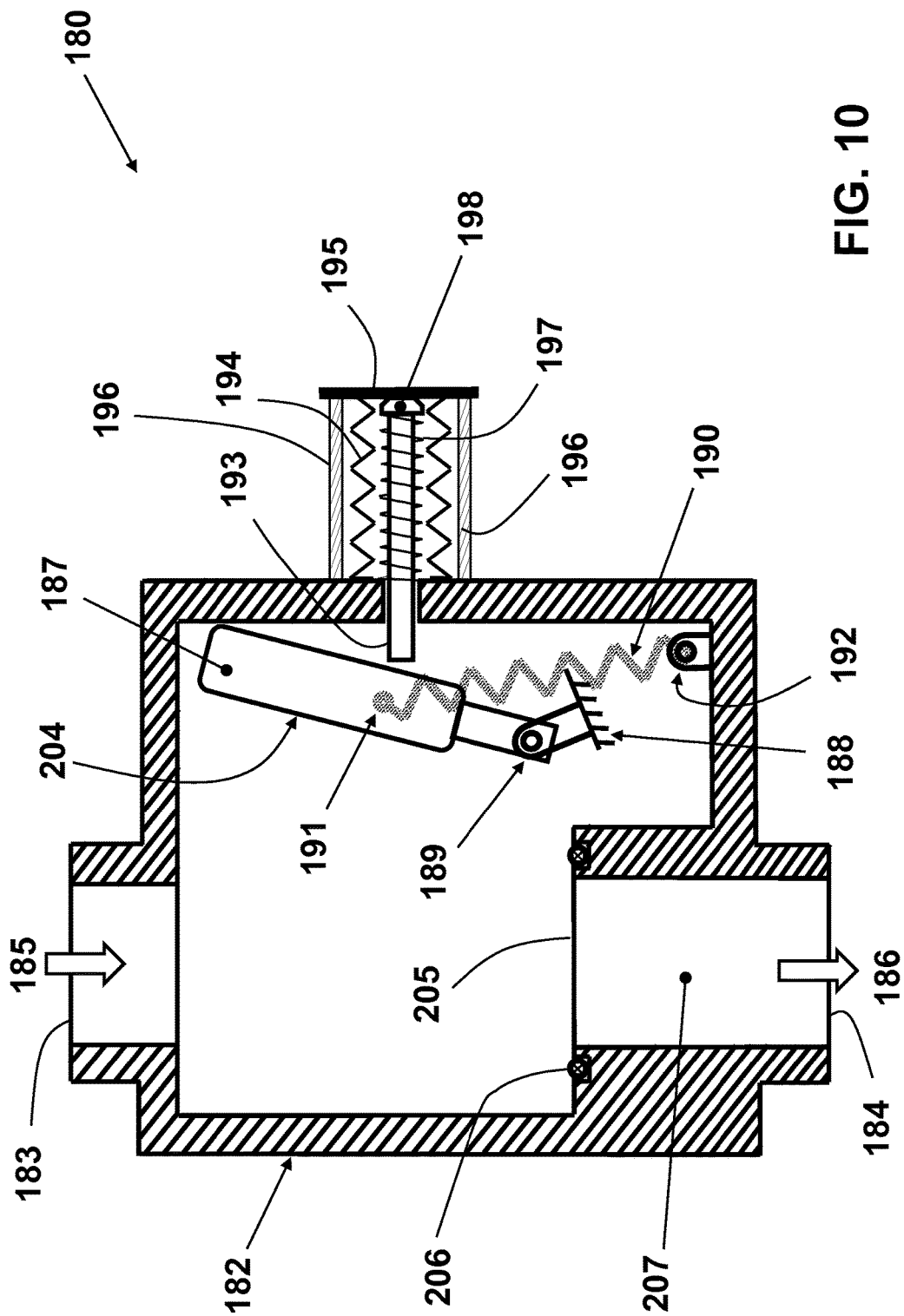
FIG. 10 illustrates a sectional view of a third embodiment of the self-contained safety valve actuated by external heating, wherein the safety valve is in an open position.

Referring now to FIG. 10, there is shown a third embodiment 180 of the self-contained safety valve that is actuated by external heating. The external heating may be due to fire or general temperature elevation without direct or proximity to fire or other heat source. The safety valve 180 can be constructed with a housing 182, which can be assembled from one or more than one part for ease of manufacture and assembly. The safety valve 180 is provided with at least one inlet 183 and at least one outlet 184 to accommodate inflow 185 and outflow 186, respectively, of the passing gaseous and/or liquid substances of interest. The inlet 183 and the outlet 184 may be provided with internal or external thread (not shown) for attachment to the intended gaseous and/or liquid substance lines. Alternatively, incoming and outgoing lines may be attached to the inlet 183 and outlet 184 by soldering, welding or any other methods appropriate for the transiting gaseous and/or liquid substance.

The safety valve 180 is provided with a cap 187, which is attached to the inside structure of the housing 182 at the indicated point 188 by a hinge joint 189. A tensile spring 190 is attached on one end to the cap 187, such as by a pin joint 191, and to the inside structure of the housing 182, such as by a pin joint 192, as shown in FIG. 10. In the configuration of the rotatable cap 187 shown in FIG. 10, the tensile spring 190 is preloaded in tension, thereby biasing the cap 187 to rest at its shown left most position against either the interior surface of the housing 182 or against an end of the actuating pin 193. As can be seen in the schematic of FIG. 10, the rotating cap 187 and the preloaded tensile spring 190 are attached to the inner surface of the housing 182 such that they configure a so-called toggle mechanism, i.e., a bi-stable mechanism with two stable resting states, with the first stable positioning being as shown in the schematic of FIG. 10, where the preloaded tensile spring 190 is positioned on the right side of the joint 189 of the cap 187, and with the second stable positioning being when the preloaded tensile spring 190 is positioned on the left side of the joint 189 of the cap 187, as shown in the schematic of FIG. 11.

The at least one shape memory alloy material based actuation device of the safety valve 180 consists of a bellow 194, which has one end attached and sealed to the outside surface of the safety valve housing 182. A cap element 195 attached to an opposite end of the bellow 194 and seals the interior volume of the bellow from the environment outside the safety valve 180 as shown in the schematic of FIG. 10. The actuating pin 193 is positioned inside the bellow 194 and is held biased away from contact with the cap 187 by the lightly preloaded compressive spring 197. At least one shape memory alloy posts 196 are positioned between the cap 195 of the bellow 194 and the outer surface of the safety valve housing 182 as shown in FIG. 10, to prevent the bellow 194 which is preloaded in tension in the configuration shown in FIG. 10 from further pushing the actuating pin 193 into the safety valve housing. The at least one shape memory alloy posts 196 can be fabricated as wires of appropriate cross-sectional areas and are either rigidly attached on at least one of their ends to the cap 195 or the outer surface of the safety valve housing 182, for example by welding or brazing or soldering, and on the other end (if not fixedly attached) held in a provided indentation (not shown) in the surface of the elements. The tensile preloaded bellow 194 may also be provided with an added preloaded tensile spring (inside or outside the bellow 194—not shown) to provide tensile biasing load for pushing the actuating pin 193 inside the housing 182 of the safety valve 180.

In the first stable toggle positioning, the cap 187 is shown to be resting against either the interior surface of the housing 182 or against the actuating pin 193 as shown in the schematic of FIG. 10. The aforementioned gaseous and/or liquid substances are thereby free to enter from the inlet 183 and exit from the outlet 184 as indicated by the arrows 185 and 186, respectively. Then when the temperature of the environment outside the safety valve 180 is increased, the aforementioned at least one shape memory alloy post 196 which is trained to change its shape in response to a rise in temperature above a predetermined threshold temperature would change its shape from that shown in FIG. 10 to that indicated by the numeral 199 or that indicated by the numeral 201 in the schematic of FIG. 11. Once the at least one shape memory alloy post 196, FIG. 10, has changed shape to that of either 199 or 201, FIG. 11, then the tensile preloaded bellow (indicated by the numeral 202 in FIG. 11) and if present, together with the aforementioned tensile preloaded spring (not shown), would force the actuating pin 193 further into the housing 182 of the safety valve 180, thereby pressing against the surface 203 of the cap 187, forcing it to rotate in the counterclockwise direction, moving from its first stable position shown in FIG. 10 and passed its aforementioned singular toggle position and then pulled by the tensile preloaded spring element 190 to its second stable positioning shown in the schematic of FIG. 11. Then as it was previously described for the embodiment 100 of FIGS. 1-2, in its said second stable positioning, FIG. 11, the surface 204 of the cap 187 rests against the top surface 205 of the outlet passage of the safety valve 180, FIG. 10. In addition, an o-ring or the like sealing element 206 which can be made out of a relatively elastic element, FIG. 10, is also provided between the mating surfaces 205 and 205 to ensure sealing of the outlet passage 207, FIGS. 10 and 11.

Figure 11:
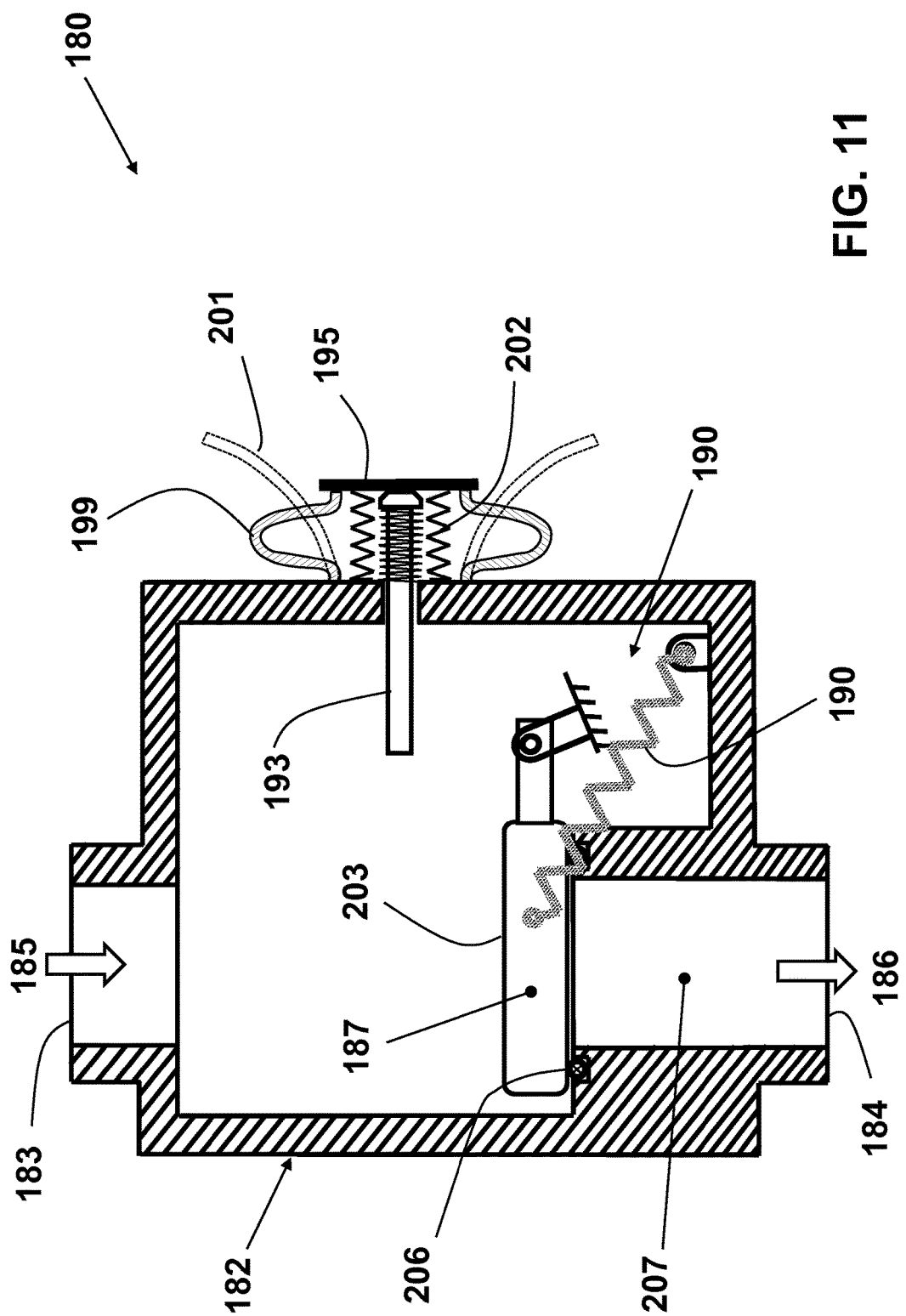
FIG. 11 illustrates the sectional view of the self-contained safety valve embodiment of FIG. 10, wherein the safety valve is in the closed position.

It will be appreciated by those skilled in the art that when both ends of the at least one shape memory alloy posts are attached to the outside surfaces of the safety valve housing 182 and the cap 195 of the bellow 194 as shown in the schematic of FIG. 10, then when the posts are subjected to temperatures at or above the aforementioned predetermined temperature threshold, then the posts must have been trained to change shape to the configuration 199 shown in FIG. 11. In such safety valve actuation mechanism designs, the shape changing shape memory alloy posts 196 will also generate a force that would tend to push the actuating pin 193 into the safety valve housing as was described earlier and thereby may be used to eliminate the need for relatively large tensile preloading of the bellow 194 and the need for the aforementioned added preloaded tensile spring (not shown).

In operation, one or more safety valves 180 are positioned along the desired gaseous and/or liquid line. The installed safety valves 180 are installed in their normally open configuration shown in FIG. 10. Then if the temperature around a safety valve rises above the aforementioned predetermined threshold temperature setting of the safety valve, the heat causes the temperature of the at least one shape memory alloy posts 196 of the safety valve 180 to rise to or above the predetermined threshold temperature and thereby change shape to the trained shape 199 (or 201) shown in FIG. 11. The tensile preloaded bellow 194 (and/or the aforementioned tensile preloaded spring provided in or outside the bellow 194—not shown) will then force the pin 193 into the safety valve housing 182 and as was described earlier force the cap 187 to its second stable positioning as shown in FIG. 11, and thereby cause the flow passage to the outlet 207 and thereby the flow of the said gaseous and/or liquid to be stopped.

In the embodiment of FIG. 10, when the safety valve 180 is exposed to an ambient temperature above the predetermined threshold temperature for which it is designed, its at least one shape memory alloy posts change shape as was described above and causes the cap 187 to move to its configuration shown in FIG. 11 and cause the flow of the gaseous and/or liquid to be stopped. Then when the ambient temperature falls below the predetermined threshold temperature, the cap 187 still remains in its configuration of FIG. 11 and the safety valve passage 207 for the flow of the line gaseous and/or liquid substances remains closed. Such safety valve designs are highly useful in housing or commercial buildings or various plants and the like so that after fire and serious damage to the building structures and/or equipment or the like that makes the related buildings and/or plants or the like inoperable and sometimes abandoned for a period of time, the flow of the line gaseous and/or liquid fuel or other chemicals substances is not accidentally resumed or even intentionally resumed by someone to cause further damage.

It will be, however, appreciated by those skilled in the art that in certain applications, it is desired that the safety valve 180 be resettable from its closed configuration shown in FIG. 11 back to its open configuration shown in FIG. 10. The task of resetting the safety valve 180 to its said open positioning following a "high temperature threshold" event may be accomplished using many different means and mechanisms. As previously mentioned, in many applications, it is preferred that the user disconnects the safety valve from at least the input or the output line for inspection and to ensure that it has not been subjected to permanent damage due to the exposure to the high temperature threshold event, particularly if it is due to fire or other similar events. However, in certain cases, where the environmental temperature does go over the said high temperature threshold often, for example, due to excessive heat being emitted from a nearby furnace, or in cases that the material being transferred is hazardous and is not desired to be spilled out from the connecting pipes, then an externally actuated means is desired to be provided for resetting the safety valve to its open positioning. It is appreciated by those skilled in the art that many such resetting mechanisms may be provided. Example of such a resetting mechanisms were described for the embodiment 100 of FIG. 1 in FIGS. 3 and 4, and the same resetting mechanisms may also be used for the embodiment 180 of FIG. 10.

In the embodiments of FIGS. 1, 7 and 10, cap elements 106, 156 and 187, respectively, which are hinged to the structure of the safety valves are used to rotate from the valve open configuration to that of the valve closed configuration once the safety valve is externally (or internally for the case of embodiments of FIGS. 1 and 7) subjected to temperatures at or above a predetermined threshold temperature. That is, the flow closing elements, i.e., the said cap elements 106, 156 and 187, respectively, are guided (via rotation or any other appropriately guided motion such as translational or a combination of rotational and translational) from their safety valve open positioning to that of safety valve closed positioning. Alternatively, the said flow closing element may be free floating, i.e., its motion may not be constrained to a given path relative to the safety valve housing via a rotary or translational joint or certain linkage type mechanism or the like. An example of such a safety valve design is described below as the fourth embodiment 200 and is illustrated in the schematic of FIG. 12.

Figure 12:
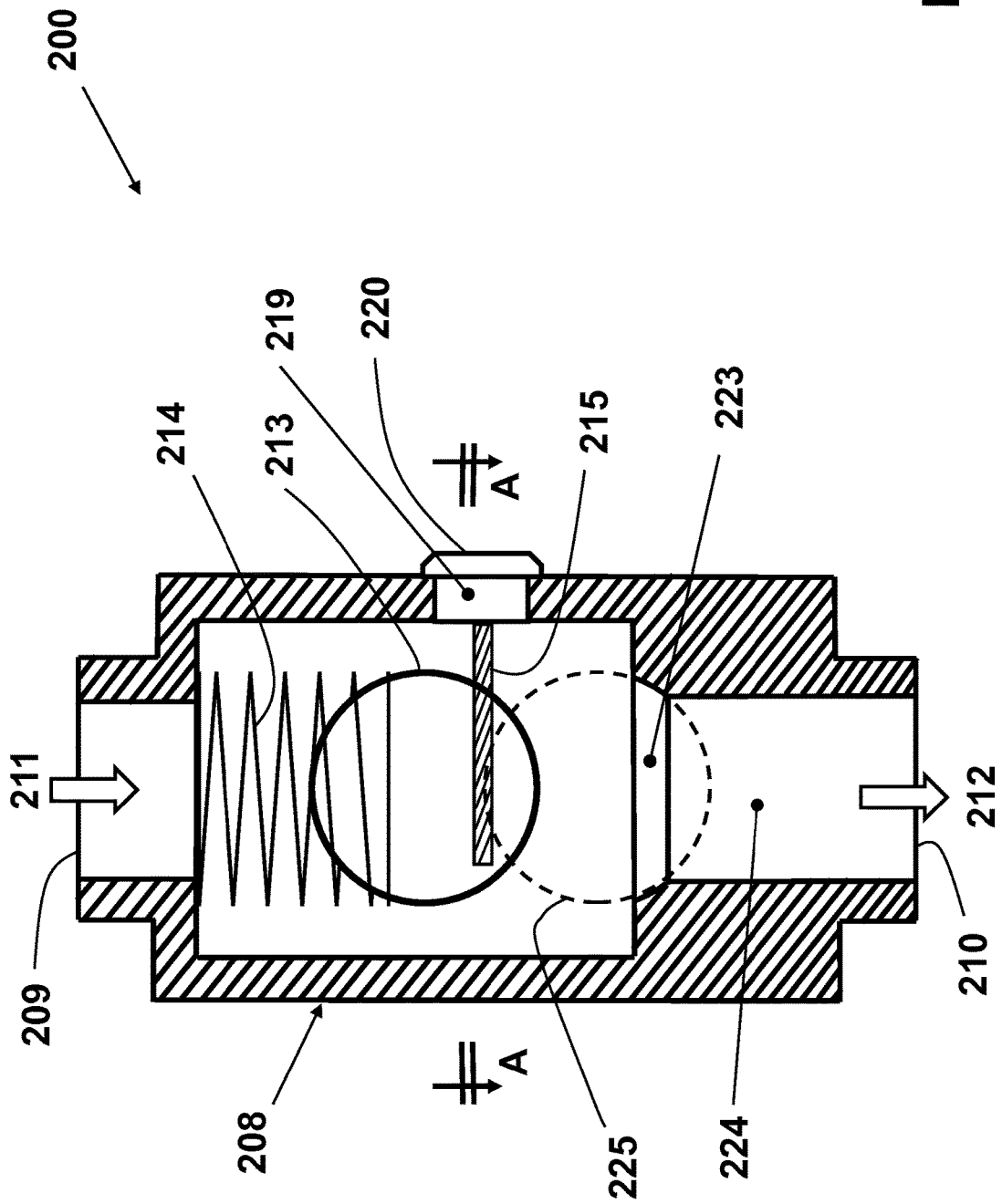
FIG. 12 illustrates a sectional view of a fourth embodiment of the self-contained safety valve actuated by external heating, wherein the safety valve is in an open position.

Referring now to FIG. 12, there is shown a fourth embodiment 200 of the self-contained safety valve that is actuated by external heating. The external heating may be due to fire or general temperature elevation without direct or proximity to fire or other heat source. The safety valve 200 is constructed with a housing 208, which may be assembled from one or more than one part for ease of manufacture and assembly. The safety valve 200 is provided with at least one inlet 209 and at least one outlet 210 to accommodate inflow 211 and outflow 212, respectively, of the passing gaseous and/or liquid substances of interest. The inlet 209 and the outlet 210 may be provided with internal or external threads (not shown) for attachment to the intended gaseous and/or liquid substance lines. Alternatively, incoming and outgoing lines may be attached to the inlet 209 and outlet 210 by soldering, welding or any other methods appropriate for the transiting gaseous and/or liquid substance.

Figure 13B:
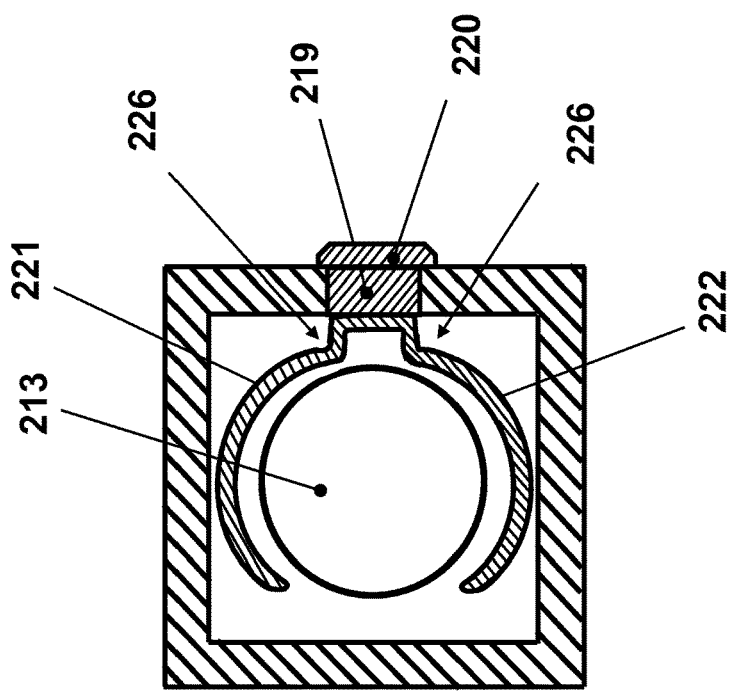
FIGS. 13A and 13B illustrates the cross-sectional view A-A of the self-contained safety valve embodiment of FIG. 12.
Figure 13A:
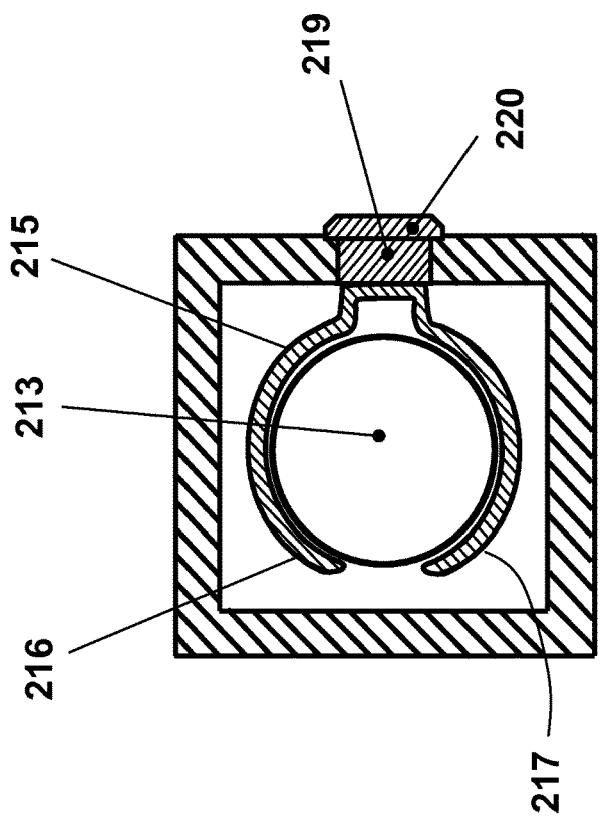

The safety valve 200 is provided with a solid ball 213, which held against a shape memory alloy element 215 which is formed with two curved beam sections 216 and 217 as shown in the cross-sectional view A-A of FIG. 13A, by the preloaded compressive biasing spring 214 as shown in FIG. 12. The shape memory alloy element 215 of the safety valve 200 is fixedly attached to the inner surface of the element 219, which is made out of a highly heat conducting material such as copper or the like which is attached and sealed to the wall of the safety valve housing 208. The element 219 is provided with a larger outside head 220 to increase the rate of heat transfer from the exterior of the safety valve 200 to the shape memory alloy element 215.

In its positioning, the ball 213 is shown to be restrained by resting against the two curved beam sections 216 and 217 of the shape memory alloy element 215 as shown in FIG. 12 and its cross-sectional view A-A of FIG. 13A. The aforementioned gaseous and/or liquid substances are thereby free to enter from the inlet 209 and exit from the outlet 210 as indicated by the arrows 211 and 212, respectively. Then when the temperature of the environment outside the safety valve 200 is increased, the shape memory alloy element is trained to change its shape in response to rise in temperatures above a predetermined threshold temperature to that shown in FIG. 13B. As can be observed in the schematics of FIGS. 13A and 13B, the shape change consist essentially in the two curved beam sections 216 and 217 of the shape memory alloy element 215 to bending outward to the positions 221 and 222, respectively, thereby allowing the preloaded compressive spring 214 to push the ball 213 passed the shape memory alloy element 215, and press it against the provided matching inlet 223 into the safety valve flow passage 224, as shown by dashed line in FIG. 12. The flow of the passing gaseous and/or liquid substances through the safety valve 200 will thereby stop.

In general, it is highly desirable that the regions 226, FIG. 13B, of the shape memory alloy element 215 is mostly deformed during the aforementioned shape change since they are close to the heat transferring elements 219 and 220, and the shape memory alloy element 215 should therefore respond rapidly to the indicated rise in temperature. As discussed above, the entire shape memory alloy element 215 need not be formed of a shape memory alloy. In this regard, only a portion, such as portion 226 closest to the element 219 may be formed of shape memory alloy.

In operation, one or more safety valves 200 can be positioned along the desired gaseous and/or liquid line. The installed safety valves 180 are installed in their normally open configuration shown in FIG. 12. Then if the temperature around a safety valve rises above the aforementioned predetermined threshold temperature setting of the safety valve, the heat causes the temperature of the shape memory alloy element 215 to rise to or above the predetermined threshold temperature. The shape memory alloy element will then change shape from the one shown in FIG. 13A to the one shown in FIG. 13B. The ball 213 is the free to be pushed down by the preloaded compressive spring 214.The ball 213 is then moved downward and seated in the matching seating surface 223, FIG. 12, and thereby cause the flow passage 224 to the outlet 210 and thereby the flow of the said gaseous and/or liquid through the safety valve to be stopped.

In the embodiment of FIG. 12, when the safety valve 200 is exposed to an ambient temperature at or above the predetermined threshold temperature for which it is designed, its shape memory alloy element 215 would change shape as was described above and causes the ball 213 to move to its positioning shown by dashed line and indicated by the numeral 225 as shown in FIG. 12 and cause the flow of the said gaseous and/or liquid to be stopped. Then when the ambient temperature falls below the said predetermined threshold temperature, the ball 213 still remains in its said positioning and the safety valve passage 224 for the flow of the line gaseous and/or liquid substances remains closed. Such safety valve designs are highly useful in housing or commercial buildings or various plants and the like so that after fire and serious damage to the building structures and/or equipment or the like that makes the related buildings and/or plats or the like inoperable and sometimes abandoned for a period of time, the flow of the line gaseous and/or liquid fuel or other chemicals substances is not accidentally resumed or even intentionally resumed by someone to cause further damage.

It will also appreciated by those skilled in the art that in place of using shape memory alloys in the design of the safety valve embodiments of FIGS. 1, 3, 4, 7 and 12, different types of bimetal elements known in the art may be used instead. One advantage of using bimetal elements for the safety valve actuation and release mechanisms is that once the ambient and the internal temperature of the safety valve have dropped below the aforementioned predetermined threshold temperature, then the bimetal element would automatically return to its original shape to open the valve. This is in contrast to one-way shape memory alloy actuation and release mechanisms that require to be deformed back to their original shape. A disadvantage of bimetal elements for the present safety valve applications is that their range of deformation is relatively small, and may thereby be more suitable for release mechanisms such as for the safety valve embodiment of FIG. 7. In contrast, shape memory alloys can undergo very large deformations and are thereby more suitable for most other embodiments.

In the embodiments of FIGS. 1, 7 and 10, the flow closing (cap) elements 106, 156 and 187, respectively, which are hinged to the structure of the safety valves are used to rotate from the valve open configuration to that of the valve closed configuration once the safety valve is externally (or internally for the case of embodiments of FIGS. 1 and 7) subjected to temperatures at or above a predetermined threshold temperature. Alternatively, the flow closing elements may be designed to slide (or undergo a combination of translational and rotational motion) rather rotate from their valve open to valve close positioning. An example of such a safety valve design is described below as the fifth embodiment 230 and is illustrated in the schematic of FIG. 14.

Figure 14:
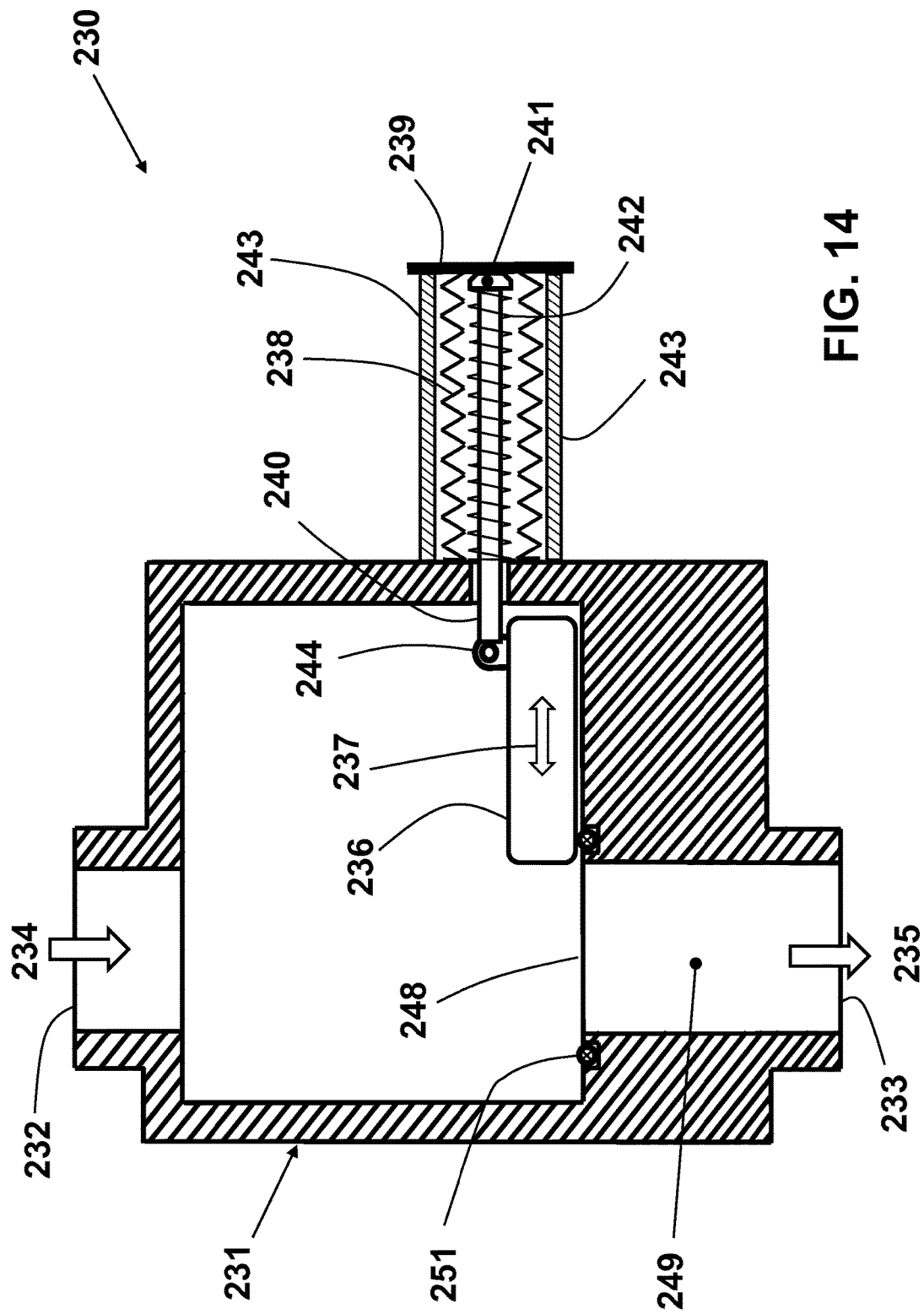
FIG. 14 illustrates a sectional view of a fifth embodiment of the self-contained safety valve actuated by external heating, wherein the safety valve is in an open position.

Referring to FIG. 14, there is shown a fifth embodiment 230 of the self-contained safety valve that is actuated by external heating. The external heating may be due to fire or general temperature elevation without direct or proximity to fire or other heat source. The safety valve 230 is constructed with a housing 231, which may have been assembled from one or more than one part for ease of manufacture and assembly. The safety valve 230 is provided with at least one inlet 232 and at least one outlet 233 to accommodate inflow 234 and outflow 235, respectively, of the passing gaseous and/or liquid substances of interest. The inlet 232 and the outlet 233 may be provided with internal or external thread (not shown) for attachment to the intended gaseous and/or liquid substance lines. Alternatively, incoming and outgoing lines may be attached to the inlet 232 and outlet 233 by soldering, welding or any other methods appropriate for the transiting gaseous and/or liquid substance.

The safety valve 230 is provided with a cap 236, which can slide laterally indicated by the arrow 237, such as in a guide provided in the interior of the housing 231 (not shown). In the position shown in FIG. 14, the safety valve 230 is in its open state and the gaseous and/or liquid substances are thereby free to enter from the inlet 232 and exit from the outlet 233 as indicated by the arrows 234 and 235, respectively.

The at least one shape memory alloy material based actuation device of the safety valve 230 consists of a bellow 238, which is attached and sealed to the outside surface of the safety valve housing 231. A cap element 239 is also attached to the opposite end of the bellow 238 and seals the interior volume of the said bellow from the environment outside the safety valve 230 as shown in the schematic of FIG. 14. An actuating pin 240, such as with a cap 241 is positioned inside the bellow 238 and is held biased by the lightly preloaded compressive spring 242 against the cap 239 as shown in FIG. 14. At least one shape memory alloy posts 243 are positioned between the cap 239 of the bellow 238 and the outer surface of the safety valve housing 231 as shown in FIG. 10, to prevent the bellow 238 which is preloaded in tension in the configuration shown in FIG. 10 from further pushing the actuating pin 240 into the safety valve housing 231. The at least one shape memory alloy posts 243 can be fabricated as wires of appropriate cross-sectional areas and are either rigidly attached on at least one of their ends to either the cap 239 or to the outer surface of the safety valve housing 231, for example by welding or brazing or soldering, and on the other end (if not similarly fixedly attached) held in a provided indentation (not shown) on the said surfaces. The tensile preloaded bellow 238 may also be provided with an added preloaded tensile spring (inside or outside the bellow 238—not shown) to provide tensile biasing load for pushing the actuating pin 240 inside the housing 231 of the safety valve 230 when ambient temperature rises to or above the aforementioned predetermined threshold temperature as will be described later.

The actuating pin is attached to the cap 236, such as by a hinge joint 244 as shown in FIG. 14. Then when the temperature of the environment outside the safety valve 230 rises to or above the aforementioned predetermined threshold temperature, the at least one shape memory alloy post 243 which is trained to change its shape in response to rise in temperature above the threshold temperature would change its shape from that shown in FIG. 10 to that indicated by the numeral 245 or that indicated by the numeral 246 in the schematic of FIG. 15. Once the at least one shape memory alloy post 243, FIG. 14, has changed shape to that of either 245 or 246, FIG. 15, then the tensile preloaded bellow (indicated by the numeral 247 in FIG. 15) and if present, together with the aforementioned tensile preloaded spring (not shown), would force the actuating pin 240 further into the housing 231 of the safety valve 230, thereby translating the cap 236 laterally to the left as shown by the arrow 237 in FIG. 14, placing it over the inlet surface 248 of the outlet passage 249 of the safety valve outlet 233 and closing the passage 249 to the through flow. In addition, an O-ring or the like sealing element 251 which is can be made out of a relatively elastic element, FIG. 14, is also provided between the mating surfaces of the cap 237 and the inlet 248 to ensure sealing of the outlet passage 249, FIGS. 14 and 15 to the extent necessary for the fluid passing through the valve and/or the application for the valve.

Figure 15:
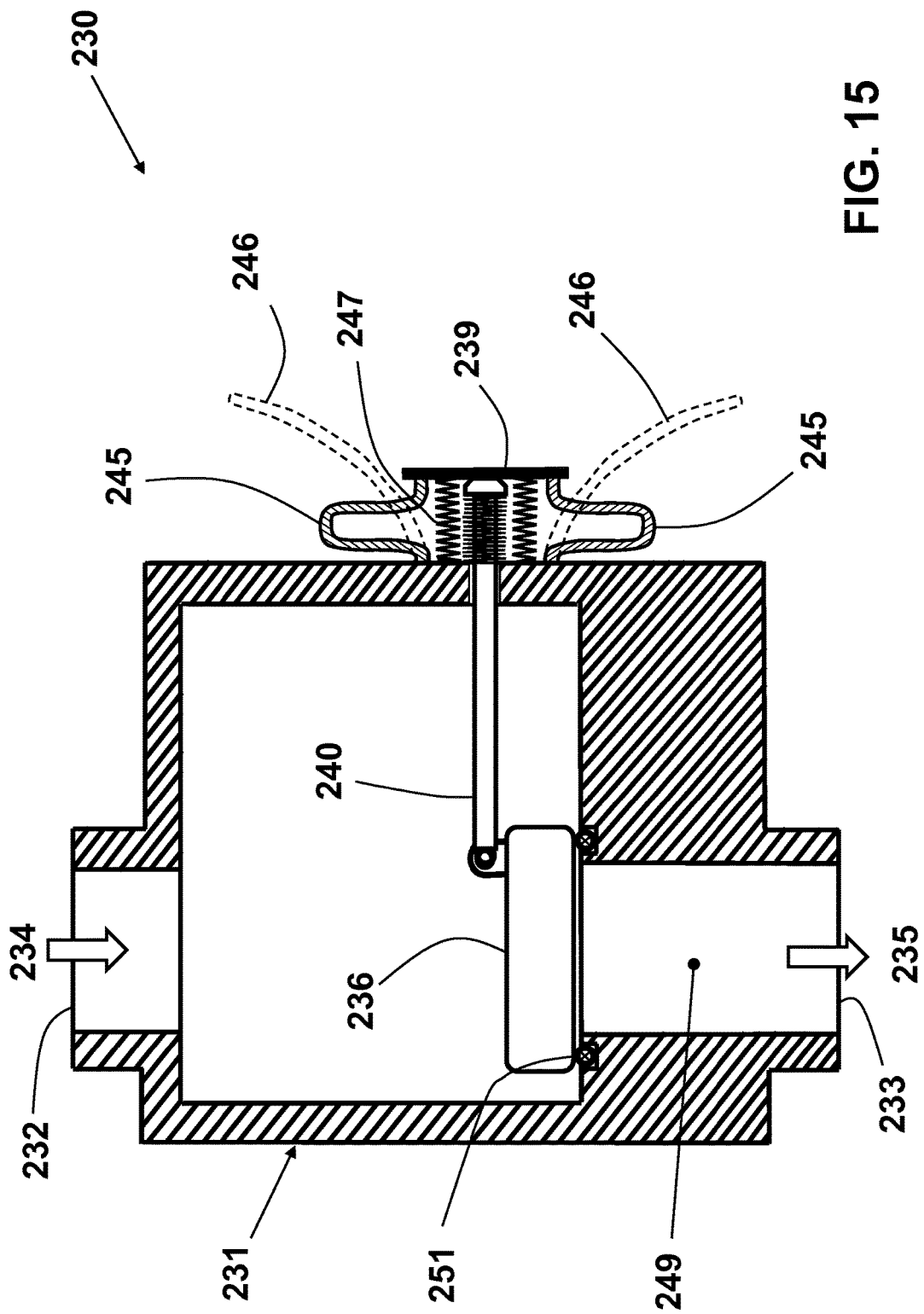
FIG. 15 illustrates the sectional view of the self-contained safety valve embodiment of FIG. 14, wherein the safety valve is in the closed position.

It will be appreciated by those skilled in the art that when both ends of the at least one shape memory alloy posts are attached to the outside surfaces of the safety valve housing 231 and the cap 239 of the bellow 238 as shown in the schematic of FIG. 14, then when the posts are subjected to temperatures at or above the aforementioned predetermined temperature threshold, then the posts must have been trained to change shape to the configuration 245 shown in FIG. 15. In such safety valve actuation mechanism designs, the shape changing shape memory alloy posts 238 will also generate a force that would tend to push the actuating pin 240 into the safety valve housing as was described earlier and thereby may be used to eliminate the need for relatively large tensile preloading of the bellow 238 and the need for the aforementioned added preloaded tensile spring (not shown).

In operation, one or more safety valves 230 are positioned along the desired gaseous and/or liquid line. The installed safety valves 230 are installed in their normally open configuration shown in FIG. 14. Then if the temperature around a safety valve rises above the aforementioned predetermined threshold temperature setting of the safety valve, the heat causes the temperature of the at least one shape memory alloy posts 238 of the safety valve 230 to rise to or above the said predetermined threshold temperature and thereby change shape to the trained shape 245 (or 246) shown in FIG. 15. The tensile preloaded bellow 238 (and the aforementioned tensile preloaded spring provided in or outside the bellow 238—not shown) will then force the pin 240 into the safety valve housing 231 and as was described earlier force the cap 236 laterally over the outlet passage 249 as shown in FIG. 15, and thereby cause the flow passage to the outlet 249 and thereby the flow of the said gaseous and/or liquid to be stopped.

In the embodiment of FIG. 14, when the safety valve 230 is exposed to an ambient temperature above the predetermined threshold temperature for which it is designed, its at least one shape memory alloy posts change shape as described above and cause the cap 236 to move to its configuration shown in FIG. 15 and cause the flow of the gaseous and/or liquid to be stopped. Then when the ambient temperature falls below the predetermined threshold temperature, the cap 236 will still remain in its configuration of FIG. 15 and the safety valve passage 249 for the flow of the line gaseous and/or liquid substances remains closed. This is the case since in general, shape memory alloy based elements, in this case the at least one post 243, do not deform back from their deformed shapes (245 or 246 in FIG. 15) to their original shape 243 of FIG. 14. Such safety valve designs are highly useful in housing or commercial buildings or various plants and the like so that after fire and serious damage to the building structures and/or equipment or the like that makes the related buildings and/or plants or the like inoperable and sometimes abandoned for a period of time, the flow of the line gaseous and/or liquid fuel or other chemicals substances is not accidentally resumed or even intentionally resumed by someone to cause further damage.

It will be, however, appreciated by those skilled in the art that in certain applications, it is desired that the safety valve 230 be manually or automatically resettable from its closed configuration shown in FIG. 15 back to its open configuration shown in FIG. 15 following exposure to temperatures at or above the aforementioned predetermined threshold temperatures. Manual resetting to the safety valve open configuration can be done simply by manually pulling the cap 239 back away from the safety valve housing until the shape memory alloy of the shape 245 of FIG. 15 has been deformed back to its original shape 243 shown in FIG. 14.

When the shape memory alloy element is designed to take the shape 246 as a result of an aforementioned high temperature event, then as the cap 239 is pulled back away from the safety valve housing, the at least one shape memory alloy posts 246 are deformed back to their original shape 243 shown in FIG. 14. It will be, however appreciated by those skilled in the art that the at least one shape memory alloy posts 243, FIG. 14, may be provided with the previously described elastic (spring) elements (not shown) that would return the deformed shape memory alloy posts of the shape 246, FIG. 15, back to their original shape 243 once the ambient temperature has dropped below the said predetermined threshold temperature. In which case, the cap 239 must still be pulled back manually away from the safety valve housing to allow the shape memory alloy posts to return to their positioning shown in FIG. 14 and support the cap 239.

It will be appreciated by those skilled in the art that if the at least one shape memory alloy posts 243 are fixedly attached to the cap 239 and the outside surface of the safety valve housing 231, FIG. 14, then upon exposure to ambient temperatures at or above the predetermined threshold temperature, the shape memory alloy posts 243 would change shape to that indicated by the numeral 245 in FIG. 15. Then if the at least one shape memory alloy posts 243 are provided with the previously described elastic (spring) elements (not shown) that would return the deformed shape memory alloy posts of the shape 245 back to their original shape 243 as shown in FIG. 14, then by providing appropriate level of tensile preloading in the bellow 238 and appropriately sizing and training the at least one shape memory allow posts 243, once the ambient temperature has dropped below the predetermined threshold temperature, the at least one shape memory alloy posts would automatically pull the cap 239 to its original positioning shown in FIG. 14. The flow closing cap 236 is thereby pulled back to its positioning shown in FIG. 14, bringing the safety valve 230 to its open state. The resulting safety valve 230 is therefore provided with an automatic means of being reset following exposure to temperatures above the predetermined threshold temperatures once the ambient temperature drops below the threshold temperature.

It will also be appreciated by those skilled in the art that the above means to automatically reset safety valve 230 following exposure to temperatures above the predetermined threshold temperatures and once the ambient temperature drops below the said threshold temperature is possible by keeping the actuating pin 240 engaged with the flow closing cap 236. It is therefore also appreciated by those skilled in the art that many other mechanisms may also be designed that operate in rotation or translation or their combination to move the flow closing element (cap 236 in FIG. 14) to achieve similar automatically resetting mechanisms.

It will be appreciated by those skilled in the art that since in the embodiments 180 and 230 of FIGS. 10 and 14, respectively, the shape memory alloy elements are located outside of the valve housing, the safety valve embodiments are therefore capable of responding much more rapidly to rise in ambient temperature than those of the other embodiments. In many applications, such a fast acting characteristic is highly desirable for heat activated safety valves. In some applications, however, particularly where the valve could be subjected to short duration ambient temperatures above the aforementioned predetermined threshold temperature due to some local transient events, then it is highly desirable that the safety valves do not respond to relatively short duration and transient rise in ambient temperature. The embodiments 100, 150 and 200 of FIGS. 1, 7 and 12, respectively, provide such a characteristic since the external heat has to first heat the heat conducting elements (elements 116, 164, and 219 in the embodiment of FIGS. 1, 7 and 12, respectively), before heating the indicated shape memory alloy elements to the predetermined shape change activation threshold temperature. It is also appreciated by those skilled in the art that by selecting materials with higher heat capacity and providing larger heat conducting elements 116, 164, and 219 in the embodiment of FIGS. 1, 7 and 12, respectively, the amount of time required for the corresponding safety valves to respond to the rise in the ambient temperatures above the aforementioned predetermined threshold temperature can be increased (to configure a time delay).

It will also be appreciated by those skilled in the art that once the safety valves of the disclosed embodiments are closed due to exposure to temperatures at or above the aforementioned threshold temperatures, then the pressure exerted by the flowing gaseous and/or liquid substances would also assist in keeping the safety valves closed to the passing flow.

In the above description of the operation of the safety valve embodiments of FIGS. 1, 3, 4, 7, 12 and 14, the shape memory alloy elements of the indicated safety valves are described as having been heated from some source external to the interior of the said safety valves through certain thermally highly conductive elements to cause the safety valve to close when the external temperature rises above the aforementioned predetermined threshold temperature. It will be, however, appreciated by those skilled in the art that the shape memory alloy elements may also be similarly heated and change shape by the gaseous and/or fluid fuel or other chemical substances that are flowing through the safety valve. It is therefore appreciated that the safety valves and other safety valve embodiments disclosed would function similarly when subjected to externally ambient temperatures above their predetermined design threshold temperatures as well as when the temperature of the passing gaseous and/or fluid substances rise above the said predetermined threshold temperature.

This is particularly useful for anti-scalding valves which would close the flow of fluid, such as hot water, when the water flowing through the valve is more than a predetermined temperature. Of course, in such applications, the highly conductive element (e.g., 116) may not be necessary. Furthermore, in such applications, if the valve is not assessable to return the same to an open configuration (e.g., is inside a closed wall), an automatic return mechanism (such as those described above) may be useful which returns the cap 106 to its first positioning as the temperature of the fluid passing there through returns to a safe temperature below the predetermined threshold temperature.

Also, more than one outlet may be provided, each with a separate cap and shape memory alloy actuator and each actuator can be configured to actuate at a different threshold temperature. For example, a first actuator may actuate at temperature T1, a second at T2, a third at T3 and a fourth at T4, where T4 is greater than T3, which is greater than T2, which is greater than T1. In such a configuration, the fluid flow, such as hot water will gradually decrease as the temperature of the fluid increases until the fluid reaches T4, at which point flow stops.

While there has been shown and described what are considered to be preferred embodiments of the invention, it will, of course, be understood that various modifications and changes in form or detail could readily be made without departing from the spirit of the invention. It is therefore intended that the invention be not limited to the exact forms described and illustrated, but should be constructed to cover all modifications that may fall within the scope of the appended claims.

What is claimed is:

1. A safety valve comprising:
   a housing having an interior, an inlet and an outlet for fluid flow from the inlet and through the outlet;
   a member being movably disposed in the interior between a first position in which the inlet and outlet are in fluid communication with each other through the interior and a second position blocking the fluid flow through the outlet; and
   an actuator configured to move the member from the first position to the second position when one of a fluid temperature in the interior of the housing or an ambient temperature outside the housing is above a predetermined threshold temperature; and
   an elastic element for biasing the member towards one of the first or the second position;
   wherein the actuator is at least partially formed of one of a shape memory material or a bi-metal material;
   the member is rotatable between the first and second positions; and
   the elastic member is a tensile spring and is connected at one end to the housing and at another end to the member such that the member is configured as a bi-stable mechanism having a first stable position corresponding to the first position and a second stable position corresponding to the second position; and
   further comprising means for returning the member from the second position to the first position, wherein the means for returning the member from the second position to the first position is automatic.

2. The safety valve of claim 1, wherein the member includes a sealing surface and the outlet includes a mating sealing surface such that the sealing surface of the member and the mating sealing surface of the outlet form a fluid seal when the member is in the second position.

3. The safety valve of claim 2, further comprising a sealing member disposed at the mating sealing surface of the outlet.

4. The safety valve of claim 1, further comprising a heat conducting member separate from the housing and formed on a wall of the housing for transferring the ambient heat to the actuator.

5. The safety valve of claim 1, further comprising a visual inspection mechanism for allowing a visual inspection of whether the member is in the first or second position from an exterior of the housing.

6. The safety valve of claim 1, wherein the actuator moves from a first shape when below the predetermined threshold temperature to a second shape when above the predetermined threshold temperature.

7. The safety valve of claim 6, further comprising means for returning the actuator from the second shape to the first shape.

8. An anti-scalding valve comprising:
   a housing having an interior, an inlet and an outlet for liquid flow from the inlet and through the outlet;
   a member being movably disposed in the interior between a first position in which the inlet and outlet are in liquid communication with each other through the interior and a second position blocking the liquid flow through the outlet; and
   an actuator configured to move the member from the first position to the second position when a liquid temperature in the interior of the housing is above a predetermined threshold temperature; and
   an elastic element for biasing the member towards one of the first or the second position;
   wherein the actuator is at least partially formed of one of a shape memory material or a bi-metal material;
   the member is rotatable between the first and second positions; and
   the elastic member is a tensile spring and is connected at one end to the housing and at another end to the member such that the member is configured as a bi-stable mechanism having a first stable position corresponding to the first position and a second stable position corresponding to the second position; and
   further comprising means for returning the member from the second position to the first position, wherein the means for returning the member from the second position to the first position is automatic.

* * * * *